US010757754B2

(12) United States Patent
Lee et al.

(10) Patent No.: US 10,757,754 B2
(45) Date of Patent: Aug. 25, 2020

(54) TECHNIQUES FOR SECURING PDCP CONTROL PDU

(71) Applicant: QUALCOMM Incorporated, San Diego, CA (US)

(72) Inventors: Soo Bum Lee, San Diego, CA (US); Gavin Bernard Horn, La Jolla, CA (US); Yu-Ting Yu, Union City, CA (US); Shailesh Maheshwari, San Diego, CA (US); Vanitha Kumar, San Diego, CA (US)

(73) Assignee: QUALCOMM Incorporated, San Diego, CA (US)

(*) Notice: Subject to any disclaimer, the term of this patent is extended or adjusted under 35 U.S.C. 154(b) by 312 days.

(21) Appl. No.: 15/595,474

(22) Filed: May 15, 2017

(65) Prior Publication Data

US 2018/0124865 A1    May 3, 2018

Related U.S. Application Data

(60) Provisional application No. 62/413,964, filed on Oct. 27, 2016.

(51) Int. Cl.
*H04L 29/06* (2006.01)
*H04W 80/02* (2009.01)
(Continued)

(52) U.S. Cl.
CPC ............ *H04W 80/02* (2013.01); *H04L 47/14* (2013.01); *H04W 12/0017* (2019.01);
(Continued)

(58) Field of Classification Search
CPC ........ H04W 80/02; H04W 12/02; H04L 47/14
See application file for complete search history.

(56) References Cited

U.S. PATENT DOCUMENTS

2009/0104890 A1* 4/2009 Wang .................... H04W 12/02
455/410
2009/0111423 A1  4/2009 Somasundaram et al.
(Continued)

OTHER PUBLICATIONS

3GPP, "3rd Generation Partnership Project; Technical Specification Group Radio Access Network; Evolved Universal Terrestrial Radio Access (E-UTRA); Packet Data Convergence Protocol (PDCP) Specification (Release 14)," 3GPP Technical Report, Sep. 2016, 39 pgs, 3GPP TS 36.323, No. V14.0.1, XP051173041, 3rd Generation Partnership Project, Valbonne, France.
(Continued)

*Primary Examiner* — Alexander Lagor
*Assistant Examiner* — Rodman Alexander Mahmoudi
(74) *Attorney, Agent, or Firm* — Holland & Hart LLP

(57) ABSTRACT

Techniques are described herein to secure a packet data convergence protocol (PDCP) control protocol data unit (PDU). A base station may determine a security configuration for a PDCP control PDU based on various factors including the content of the PDCP control PDU. For example, the security configuration of the PDCP control PDU may be applied because the PDCP control PDU includes a retransmission request. A counter dedicated to PDCP control PDUs may be initialized. The security protocols may be based on the dedicated counter. Some types of security parameters may be shared in some contexts such as in handover procedures or dual connectivity procedures. For example, security configurations associated with a second communication link may be based on security configurations associated with a first communication link. PDCP control PDUs may be secured based on the security configurations, the security parameters, protection keys, or combinations thereof.

26 Claims, 22 Drawing Sheets

(51) Int. Cl.
*H04W 12/04* (2009.01)
*H04W 12/00* (2009.01)
*H04L 12/801* (2013.01)
*H04W 88/08* (2009.01)
*H04W 36/00* (2009.01)
*H04L 29/08* (2006.01)
*H04W 28/06* (2009.01)

(52) U.S. Cl.
CPC ........... *H04W 12/04* (2013.01); *H04L 69/322* (2013.01); *H04W 28/06* (2013.01); *H04W 36/0038* (2013.01); *H04W 36/0069* (2018.08); *H04W 88/085* (2013.01)

(56) References Cited

U.S. PATENT DOCUMENTS

| | | | |
|---|---|---|---|
| 2010/0118781 A1* | 5/2010 | Petrovic | H04L 1/1887 370/328 |
| 2013/0044730 A1 | 2/2013 | Qian et al. | |
| 2013/0135987 A1 | 5/2013 | Wang et al. | |
| 2013/0301467 A1 | 11/2013 | Kang et al. | |
| 2014/0044097 A1* | 2/2014 | Chen | H04W 36/24 370/331 |
| 2014/0105396 A1* | 4/2014 | Engelien-Lopes | H04W 12/04 380/270 |
| 2014/0256247 A1 | 9/2014 | Wietfeldt et al. | |
| 2014/0341189 A1 | 11/2014 | Yang et al. | |
| 2015/0095985 A1 | 4/2015 | Hua et al. | |
| 2015/0208235 A1 | 7/2015 | Ingale et al. | |
| 2015/0304903 A1 | 10/2015 | Uchino et al. | |
| 2015/0304966 A1 | 10/2015 | Park et al. | |
| 2016/0055445 A1 | 2/2016 | Sessoms et al. | |
| 2016/0127882 A1* | 5/2016 | Agiwal | H04L 9/0861 713/150 |
| 2016/0277445 A1* | 9/2016 | Wager | H04W 12/00 |

OTHER PUBLICATIONS

3GPP, "3rd Generation Partnership Project; Technical Specification Group Radio Access Network; Evolved Universal Terrestrial Radio Access Network (E-UTRAN); S1 Application Protocol (S1AP) (Release 10)," 3GPP Technical Specification, Jun. 2011, 253 pgs, 3GPP TS 36.413, No. V10.2.0, XP050553583, 3rd Generation Partnership Project, Valbonne, France.

ISA/EP, International Search Report and Written Opinion of the International Searching Authority, Int'l Application No. PCT/US2017/047786, dated Nov. 22, 2017, European Patent Office, Rijswijk, NL, 18 pgs.

* cited by examiner (1)

TECHNIQUES FOR SECURING PDCP CONTROL PDU

CROSS REFERENCES

The present Application for Patent claims priority to U.S. Provisional Patent Application No. 62/413,964 by LEE, et al., entitled "TECHNIQUES FOR SECURING PDCP CONTROL PDU," filed Oct. 27, 2016, assigned to the assignee hereof.

BACKGROUND

The following relates generally to wireless communication, and more specifically to techniques for securing a packet data convergence protocol (PDCP) control protocol data unit (PDU).

Wireless communications systems are widely deployed to provide various types of communication content such as voice, video, packet data, messaging, broadcast, and so on. These systems may be capable of supporting communication with multiple users by sharing the available system resources (e.g., time, frequency, and power). Examples of such multiple-access systems include code division multiple access (CDMA) systems, time division multiple access (TDMA) systems, frequency division multiple access (FDMA) systems, and orthogonal frequency division multiple access (OFDMA) systems, (e.g., a Long Term Evolution (LTE) system, or a New Radio (NR) system). A wireless multiple-access communications system may include a number of base stations or access network nodes, each simultaneously supporting communication for multiple communication devices, which may be otherwise known as user equipment (UE).

In some aspects, security protocols may be applied to some transmissions exchanged between entities in a wireless communication system. For example, different kinds of protection may be applied to some transmissions between a base station and a UE. However, not all transmissions are secured using security protocols.

SUMMARY

The described techniques relate to improved methods, systems, devices, or apparatuses that support securing a PDCP control PDU. A base station may determine a security configuration for a PDCP control PDU based on various factors including the content of the PDCP control PDU. For example, the security configuration of the PDCP control PDU may be applied because the PDCP control PDU includes a retransmission request (e.g., automatic reply request (ARQ)). A counter related to PDCP control PDUs may be initialized in some aspects. The security protocols may be based on the related counter (e.g., a dedicated counter). Some types of security parameters may be shared in various contexts such as in handover procedures or dual connectivity procedures. For example, security configurations associated with a communication link may be based on security configurations associated with another communication link. PDCP control PDUs may be secured based on the security configurations, the security parameters, protection keys, or combinations thereof.

A method of wireless communication is described. The method may include establishing a connection with an access network entity, generating a PDCP control PDU based at least in part on the connection, determining a security configuration associated with the PDCP control PDU, and securing the PDCP control PDU based at least in part on the security configuration.

An apparatus for wireless communication is described. The apparatus may include means for establishing a connection with an access network entity, means for generating a PDCP control PDU based at least in part on the connection, means for determining a security configuration associated with the PDCP control PDU, and means for securing the PDCP control PDU based at least in part on the security configuration.

Another apparatus for wireless communication is described. The apparatus may include a processor, memory in electronic communication with the processor, and instructions stored in the memory. The instructions may be operable to cause the processor to cause the apparatus to establish a connection with an access network entity, generate a PDCP control PDU based at least in part on the connection, determine a security configuration associated with the PDCP control PDU, and secure the PDCP control PDU based at least in part on the security configuration.

A non-transitory computer readable medium for wireless communication is described. The non-transitory computer-readable medium may include instructions operable to cause a processor to establish a connection with an access network entity, generate a PDCP control PDU based at least in part on the connection, determine a security configuration associated with the PDCP control PDU, and secure the PDCP control PDU based at least in part on the security configuration.

In some examples of the method, apparatus, and non-transitory computer-readable medium described above, the PDCP control PDU comprises a PDCP status PDU.

Some examples of the method, apparatus, and non-transitory computer-readable medium described above may further include processes, features, means, or instructions for receiving the security configuration including a security parameter. Some examples of the method, apparatus, and non-transitory computer-readable medium described above may further include processes, features, means, or instructions for obtaining a protection key for the PDCP control PDU based at least in part on the security parameter.

In some examples of the method, apparatus, and non-transitory computer-readable medium described above, the security parameter comprises a second protection key associated with the connection, or a counter associated with the connection, or context data, or some combination thereof.

Some examples of the method, apparatus, and non-transitory computer-readable medium described above may further include processes, features, means, or instructions for generating a control input parameter for a message authentication code based at least in part on the security configuration, the control input parameter indicating whether an associated PDU may be the PDCP control PDU.

Some examples of the method, apparatus, and non-transitory computer-readable medium described above may further include processes, features, means, or instructions for generating a security information element (IE) for a Radio Resource Control (RRC) message, the security IE based at least in part on the security configuration, wherein the security configuration may be obtained from a security IE in an RRC message received from the access network entity.

In some examples of the method, apparatus, and non-transitory computer-readable medium described above, the security IE indicates a type of security, or security algorithms, or a combination thereof.

In some examples of the method, apparatus, and non-transitory computer-readable medium described above, the PDCP control PDU comprises an interspersed robust header compression (ROHC) feedback packet.

In some examples of the method, apparatus, and non-transitory computer-readable medium described above, the access network entity comprises a base station.

Some examples of the method, apparatus, and non-transitory computer-readable medium described above may further include processes, features, means, or instructions for determining that the PDCP control PDU should be secured based at least in part on information contained in the security configuration, wherein securing the PDCP control PDU may be based at least in part on the determining.

A method of wireless communication is described. The method may include establishing a connection between the access network entity and a UE and transmitting a security parameter to the UE, wherein the security parameter is configured to secure a PDCP control PDU.

An apparatus for wireless communication is described. The apparatus may include means for establishing a connection between the access network entity and a UE and means for transmitting a security parameter to the UE, wherein the security parameter is configured to secure a PDCP control PDU.

Another apparatus for wireless communication is described. The apparatus may include a processor, memory in electronic communication with the processor, and instructions stored in the memory. The instructions may be operable to cause the processor to establish a connection between the access network entity and a UE and transmit a security parameter to the UE, wherein the security parameter is configured to secure a PDCP control PDU.

A non-transitory computer readable medium for wireless communication is described. The non-transitory computer-readable medium may include instructions operable to cause a processor to establish a connection between the access network entity and a UE and transmit a security parameter to the UE, wherein the security parameter is configured to secure a PDCP control PDU.

Some examples of the method, apparatus, and non-transitory computer-readable medium described above may further include processes, features, means, or instructions for identifying a first communication link associated with the connection, wherein the security parameter may be transmitted based at least in part on identifying the first communication link and the PDCP control PDU may be associated with the first communication link.

In some examples of the method, apparatus, and non-transitory computer-readable medium described above, the security parameter comprises a counter.

In some examples of the method, apparatus, and non-transitory computer-readable medium described above, transmitting the security parameter further comprises: transferring a security configuration associated with a second communication link associated with the connection to the UE based at least in part on the identifying.

Some examples of the method, apparatus, and non-transitory computer-readable medium described above may further include processes, features, means, or instructions for initializing the security parameter based at least in part on establishing the connection.

Some examples of the method, apparatus, and non-transitory computer-readable medium described above may further include processes, features, means, or instructions for generating the security parameter based at least in part on a new communication link associated with the connection.

Some examples of the method, apparatus, and non-transitory computer-readable medium described above may further include processes, features, means, or instructions for executing a handover procedure of the UE between a source transmission and reception point (TRP) associated with a second communication link and a target TRP associated with the first communication link. Some examples of the method, apparatus, and non-transitory computer-readable medium described above may further include processes, features, means, or instructions for identifying a second security parameter associated with the second communication link based at least in part on the handover procedure, wherein the security parameter may be based at least in part on a modified version of the second security parameter.

Some examples of the method, apparatus, and non-transitory computer-readable medium described above may further include processes, features, means, or instructions for transmitting a handover request to the target TRP based at least in part on executing the handover procedure.

In some examples of the method, apparatus, and non-transitory computer-readable medium described above, transmitting the security parameter further comprises: transmitting a RRC connection reconfiguration message that includes the modified security parameter to the UE based at least in part on executing the handover procedure.

Some examples of the method, apparatus, and non-transitory computer-readable medium described above may further include processes, features, means, or instructions for executing a dual connectivity procedure, wherein the first communication link may be between a first node and the UE and a second communication link associated with the connection may be between a second node and the UE. Some examples of the method, apparatus, and non-transitory computer-readable medium described above may further include processes, features, means, or instructions for identifying a second security parameter associated with the second communication link. Some examples of the method, apparatus, and non-transitory computer-readable medium described above may further include processes, features, means, or instructions for initializing the security parameter based at least in part on the second security parameter.

In some examples of the method, apparatus, and non-transitory computer-readable medium described above, the second node may be a master node and the first node may be a secondary node.

Some examples of the method, apparatus, and non-transitory computer-readable medium described above may further include processes, features, means, or instructions for transmitting the second security parameter with the security parameter based at least in part on executing the dual connectivity procedure and initializing the second security parameter.

In some examples of the method, apparatus, and non-transitory computer-readable medium described above, the first communication link may be established using a first radio access technology (RAT). In some examples of the method, apparatus, and non-transitory computer-readable medium described above, the second communication link may be established using a second RAT.

In some examples of the method, apparatus, and non-transitory computer-readable medium described above, transmitting the security parameter further comprises: transmitting, by the second node, a RRC connection reconfiguration message that includes the security parameter and the second security parameter to the UE based at least in part on the executing the dual connectivity procedure.

A method of wireless communication is described. The method may include establishing a connection between an access network entity and the UE, identifying a first communication link associated with the connection, receiving a security parameter associated with a second communication link associated with the connection, and securing a PDCP control PDU associated with the first communication link based at least in part on the security parameter.

An apparatus for wireless communication is described. The apparatus may include means for establishing a connection between an access network entity and the UE, means for identifying a first communication link associated with the connection, means for receiving a security parameter associated with a second communication link associated with the connection, and means for securing a PDCP control PDU associated with the first communication link based at least in part on the security parameter.

Another apparatus for wireless communication is described. The apparatus may include a processor, memory in electronic communication with the processor, and instructions stored in the memory. The instructions may be operable to cause the processor to establish a connection between an access network entity and the UE, identify a first communication link associated with the connection, receive a security parameter associated with a second communication link associated with the connection, and secure a PDCP control PDU associated with the first communication link based at least in part on the security parameter.

A non-transitory computer readable medium for wireless communication is described. The non-transitory computer-readable medium may include instructions operable to cause a processor to establish a connection between an access network entity and the UE, identify a first communication link associated with the connection, receive a security parameter associated with a second communication link associated with the connection, and secure a PDCP control PDU associated with the first communication link based at least in part on the security parameter.

In some examples of the method, apparatus, and non-transitory computer-readable medium described above, the security parameter comprises a counter.

Some examples of the method, apparatus, and non-transitory computer-readable medium described above may further include processes, features, means, or instructions for receiving a handover command from the access network entity.

Some examples of the method, apparatus, and non-transitory computer-readable medium described above may further include processes, features, means, or instructions for receiving a RRC connection reconfiguration message from the access network entity.

Some examples of the method, apparatus, and non-transitory computer-readable medium described above may further include processes, features, means, or instructions for receiving a RRC connection reconfiguration message indicating a status from the access network entity.

Some examples of the method, apparatus, and non-transitory computer-readable medium described above may further include processes, features, means, or instructions for generating a protection key based at least in part on the security parameter, wherein securing the PDCP control PDU may be based at least in part on the protection key.

DETAILED DESCRIPTION

In some wireless communication systems, security protocols may be implemented at the PDCP layer. In some aspects, data generated by or related to layers lower than the PDCP layer may be protected using the security protocols implemented at the PDCP layer. In addition, control information generated by or related to the PDCP layer may not be secured with security protocols in some wireless communication systems. Communications between entities in a communications system may be disrupted by attacks targeting unprotected data.

Techniques are described herein to secure a PDCP control PDU. A base station may determine a security configuration for a PDCP control PDU based on various factors including the content of the PDCP control PDU. For example, the security configuration of the PDCP control PDU may indicate that certain security protocols should be applied because the PDCP control PDU includes some information (e.g., a retransmission request such as an ARQ).

In one aspect, a counter dedicated to PDCP control PDUs may be initialized. The security protocols may be based on the dedicated counter.

In one aspect, some types of security parameters may be shared in some contexts. For example, security configurations associated with a communication link may be based on security configurations associated with another communication link. For example, security configurations may be associated with PDCP control PDUs being exchanged via multiple communication links. PDCP control PDUs may be secured based on the security configurations, the security parameters, protection keys, or combinations thereof.

By securing PDCP control PDUs, the data contained therein may be protected from unwanted intrusion (e.g., PDCP control PDU modification, bogus PDCP control PDU injection, eavesdropping PDCP control PDUs). Initializing a dedicated counter for PDCP control PDUs, instead of using the counter for PDCP data PDUs, may reduce the processing time of the security protocols. For example, processing times may be reduced by processing security protection (e.g., ciphering, integrity protection or a combination thereof) of PDCP control PDUs and that of PDCP data PDUs separately. By generating security configurations for new communication links based on the existing communication links, processing efficiencies may be realized.

Aspects of the disclosure are initially described in the context of a wireless communications system. Aspects of the disclosure are illustrated by and described with reference to communication systems, process flows, and message formats. Aspects of the disclosure are further illustrated by and described with reference to apparatus diagrams, system diagrams, and flowcharts that relate to techniques for securing a PDCP control PDU.

Figure 1:
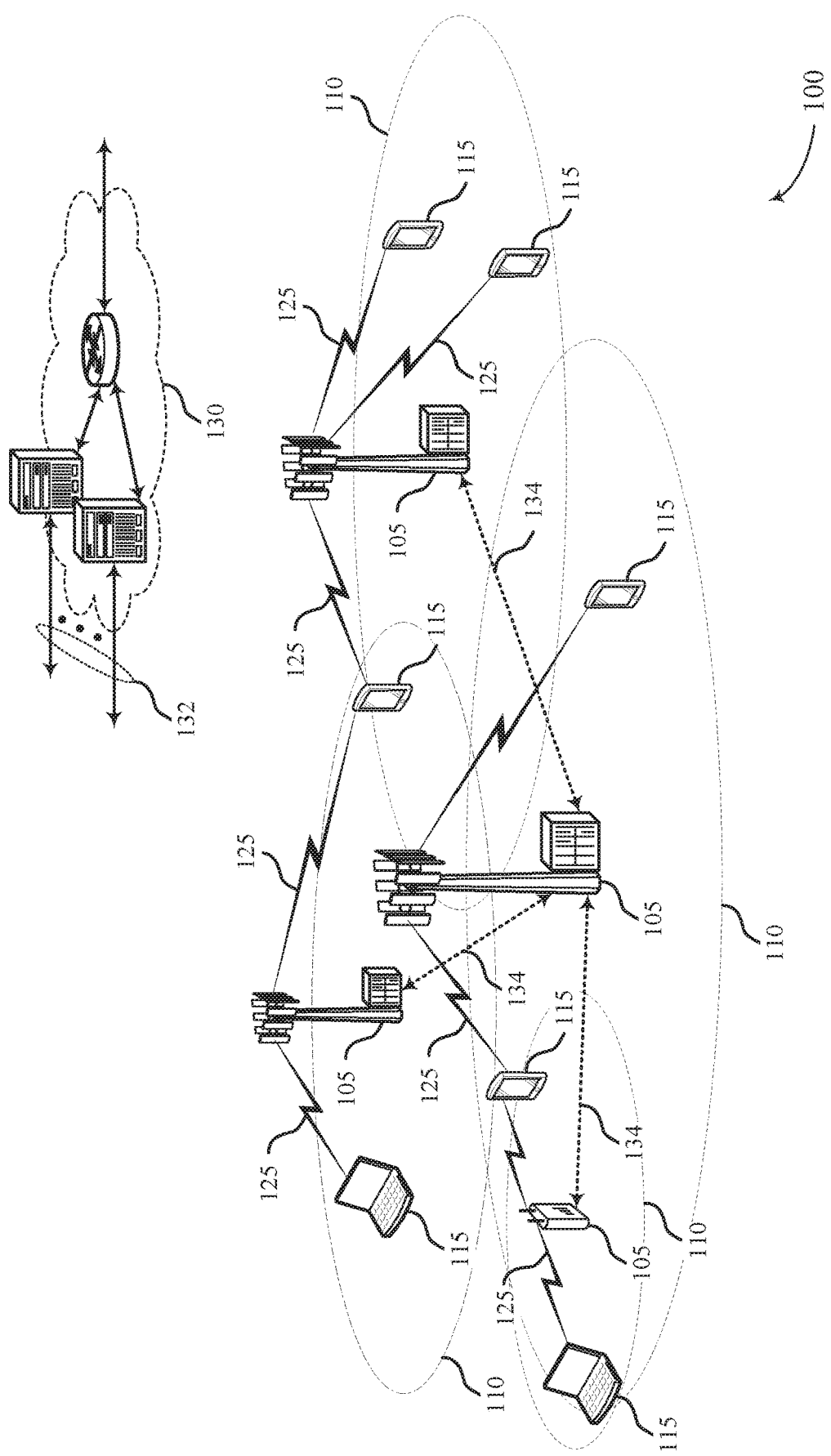
FIG. 1 illustrates an example of a system for wireless communication that supports techniques for securing a PDCP control PDU in accordance with aspects of the present disclosure.

FIG. 1 illustrates an example of a wireless communications system 100 in accordance with various aspects of the present disclosure. The wireless communications system 100 includes base stations 105, UEs 115, and a core network 130. In some examples, the wireless communications system 100 may be a LTE (or LTE-Advanced (LTE-A)) network, or a NR network. In some aspects, wireless communications system 100 may support enhanced broadband communications, ultra-reliable (i.e., mission critical) communications, low latency communications, and communications with low-cost and low-complexity devices. In addition, the wireless communications system 100 may support techniques for securing control PDUs generated by the PDCP layer.

Base stations 105 may wirelessly communicate with UEs 115 via one or more base station antennas. Each base station 105 may provide communication coverage for a respective geographic coverage area 110. Communication links 125 shown in wireless communications system 100 may include uplink (UL) transmissions from a UE 115 to a base station 105, or downlink (DL) transmissions, from a base station 105 to a UE 115. Control information and data may be multiplexed on an uplink channel or downlink according to various techniques. Control information and data may be multiplexed on a downlink channel, for example, using time division multiplexing (TDM) techniques, frequency division multiplexing (FDM) techniques, or hybrid TDM-FDM techniques. In some examples, the control information transmitted during a transmission time interval (TTI) of a downlink channel may be distributed between different control regions in a cascaded manner (e.g., between a common control region and one or more UE-specific control regions). The wireless communications system 100 may also include access network entities configured to manage communications between entities. In some examples, access network entities may include one or more base stations. As used herein, the term base station may refer to access network entities and vice-versa.

UEs 115 may be dispersed throughout the wireless communications system 100, and each UE 115 may be stationary or mobile. A UE 115 may also be referred to as a mobile station, a subscriber station, a mobile unit, a subscriber unit, a wireless unit, a remote unit, a mobile device, a wireless device, a wireless communications device, a remote device, a mobile subscriber station, an access terminal, a mobile terminal, a wireless terminal, a remote terminal, a handset, a user agent, a mobile client, a client, or some other suitable terminology. A UE 115 may also be a cellular phone, a personal digital assistant (PDA), a wireless modem, a wireless communication device, a handheld device, a tablet computer, a laptop computer, a cordless phone, a personal electronic device, a handheld device, a personal computer, a wireless local loop (WLL) station, an Internet of things (IoT) device, an Internet of Everything (IoE) device, a machine type communication (MTC) device, an appliance, an automobile, or the like.

In some aspects, a UE 115 may also be able to communicate directly with other UEs (e.g., using a peer-to-peer (P2P) or device-to-device (D2D) protocol). One or more of a group of UEs 115 utilizing D2D communications may be within the coverage area 110 of a cell. Other UEs 115 in such a group may be outside the coverage area 110 of a cell, or otherwise unable to receive transmissions from a base station 105. In some aspects, groups of UEs 115 communicating via D2D communications may utilize a one-to-many (1:M) system in which each UE 115 transmits to every other UE 115 in the group. In some aspects, a base station 105 facilitates the scheduling of resources for D2D communications. In other aspects, D2D communications are carried out independent of a base station 105.

Some UEs 115, such as MTC or IoT devices, may be low cost or low complexity devices, and may provide for automated communication between machines, i.e., Machine-to-Machine (M2M) communication. M2M or MTC may refer to data communication technologies that allow devices to communicate with one another or a base station without human intervention. For example, M2M or MTC may refer to communications from devices that integrate sensors or meters to measure or capture information and relay that information to a central server or application program that can make use of the information or present the information to humans interacting with the program or application. Some UEs 115 may be designed to collect information or enable automated behavior of machines. Examples of applications for MTC devices include smart metering, inventory monitoring, water level monitoring, equipment monitoring, healthcare monitoring, wildlife monitoring, weather and geological event monitoring, fleet management and tracking, remote security sensing, physical access control, and transaction-based business charging.

In some aspects, an MTC device may operate using half-duplex (one-way) communications at a reduced peak rate. MTC devices may also be configured to enter a power saving "deep sleep" mode when not engaging in active communications. In some aspects, MTC or IoT devices may be designed to support mission critical functions and wireless communications system may be configured to provide ultra-reliable communications for these functions.

Base stations 105 may communicate with the core network 130 and with one another. For example, base stations 105 may interface with the core network 130 through backhaul links 132 (e.g., S1, etc.). Base stations 105 may communicate with one another over backhaul links 134 (e.g., X2, etc.) either directly or indirectly (e.g., through core network 130). Base stations 105 may perform radio configuration and scheduling for communication with UEs 115, or may operate under the control of a base station controller (not shown). In some examples, base stations 105 may be macro cells, small cells, hot spots, or the like. Base stations 105 (and/or evolved node Bs, eNodeBs, NodeBs) may also be referred to as eNodeBs (eNBs) 105 and/or next generation NodeB (gNB).

A base station 105 may be connected by an S1 interface to the core network 130. The core network may be an evolved packet core (EPC) or a NextGen Core (NGC). The EPC may include at least one mobile management entity (MME), at least one S-GW, and at least one P-GW. The MME may be the control node that processes the signaling between the UE 115 and the EPC. All user Internet Protocol (IP) packets may be transferred through the S-GW, which itself may be connected to the P-GW. The P-GW may provide IP address allocation as well as other functions. The P-GW may be connected to the network operators IP services. The NGC may include at least one access and mobility management function (AMF) and at least one session management function (SMF), and at least one user-plane function (UPF). The operators IP services may include the Internet, the Intranet, an IP Multimedia Subsystem (IMS), and a Packet-Switched (PS) Streaming Service (PSS).

The core network 130 may provide user authentication, access authorization, tracking, IP connectivity, and other access, routing, or mobility functions. At least some of the network devices, such as base station 105-a may include subcomponents such as an access network entity 105-b, which may be an example of an access node controller (ANC). Each access network entity 105-b may communicate with a number of UEs 115 through a number of other access network transmission entities 105-c, which may be an example of a smart radio head, or a TRP. In some configurations, various functions of each access network entity or base station 105 may be distributed across various network devices 105 (e.g., radio heads and access network controllers) or consolidated into a single network device 105 (e.g., a base station).

One or more of network devices 105 may include an access network entity security manager 101, which may manage security configurations, security parameters, or protections keys associated with PDCP control PDUs. For example, the access network entity security manager 101 may determine a security configuration for PDCP control PDUs associated with the connection between a UE 115 and the access network entity 105-b. In some examples, the access network entity security manager 101 may facilitate handover procedures and dual connectivity in connection with security configurations for PDCP control PDUs, among other operations in accordance with the present disclosure.

UEs 115 may include a UE security manager 102, which may manage security configurations, security parameters, or protections keys associated with PDCP control PDUs. For example, the UE security manager 102 may receive a security configuration, which may include security parameters and protections, and may secure PDCP control PDUs based on the security configuration.

Wireless communications system 100 may operate in an ultra-high frequency (UHF) frequency region using frequency bands from 700 MHz to 2600 MHz (2.6 GHz), although in some aspects wireless local area network (WLAN) networks may use frequencies as high as 4 GHz. This region may also be known as the decimeter band, since the wavelengths range from approximately one decimeter to one meter in length. UHF waves may propagate mainly by line of sight, and may be blocked by buildings and environmental features. However, the waves may penetrate walls sufficiently to provide service to UEs 115 located indoors. Transmission of UHF waves is characterized by smaller antennas and shorter range (e.g., less than 100 km) compared to transmission using the smaller frequencies (and longer waves) of the high frequency (HF) or very high frequency (VHF) portion of the spectrum. In some aspects, wireless communications system 100 may also utilize extremely high frequency (EHF) portions of the spectrum (e.g., from 30 GHz to 300 GHz). This region may also be known as the millimeter band, since the wavelengths range from approximately one millimeter to one centimeter in length. Thus, EHF antennas may be even smaller and more closely spaced than UHF antennas. In some aspects, this may facilitate use of antenna arrays within a UE 115 (e.g., for directional beamforming). However, EHF transmissions may be subject to even greater atmospheric attenuation and shorter range than UHF transmissions.

Thus, wireless communications system 100 may support millimeter wave (mmW) communications between UEs 115 and base stations 105. Devices operating in mmW or EHF bands may have multiple antennas to allow beamforming. That is, a base station 105 may use multiple antennas or antenna arrays to conduct beamforming operations for directional communications with a UE 115. Beamforming (which may also be referred to as spatial filtering or directional transmission) is a signal processing technique that may be used at a transmitter (e.g. a base station 105) to shape and/or steer an overall antenna beam in the direction of a target receiver (e.g. a UE 115). This may be achieved by combining elements in an antenna array in such a way that transmitted signals at particular angles experience constructive interference while others experience destructive interference.

Multiple-input multiple-output (MIMO) wireless systems use a transmission scheme between a transmitter (e.g. a base station) and a receiver (e.g. a UE), where both transmitter and receiver are equipped with multiple antennas. Some portions of wireless communications system 100 may use beamforming. For example, base station 105 may have an antenna array with a number of rows and columns of antenna ports that the base station 105 may use for beamforming in its communication with UE 115. Signals may be transmitted multiple times in different directions (e.g., each transmission may be beam-formed differently). A mmW receiver (e.g., a UE 115) may try multiple beams (e.g., antenna subarrays) while receiving the synchronization signals.

In some aspects, the antennas of a base station 105 or UE 115 may be located within one or more antenna arrays, which may support beamforming or MIMO operation. One or more base station antennas or antenna arrays may be collocated at an antenna assembly, such as an antenna tower. In some aspects, antennas or antenna arrays associated with a base station 105 may be located in diverse geographic locations. A base station 105 may multiple use antennas or antenna arrays to conduct beamforming operations for directional communications with a UE 115.

In some aspects, wireless communications system 100 may be a packet-based network that operate according to a layered protocol stack. In the user plane, communications at the bearer or PDCP layer may be IP-based. A Radio Link Control (RLC) layer may in some aspects perform packet segmentation and reassembly to communicate over logical channels. A Media Access Control (MAC) layer may perform priority handling and multiplexing of logical channels into transport channels. The MAC layer may also use Hybrid ARQ (HARD) to provide retransmission at the MAC layer to improve link efficiency. In the control plane, the RRC protocol layer may provide establishment, configuration, and maintenance of an RRC connection between a UE 115 and a network device 105-c, network device 105-b, or core network 130 supporting radio bearers for user plane data. At the Physical (PHY) layer, transport channels may be mapped to physical channels.

Time intervals in LTE or NR may be expressed in multiples of a basic time unit (which may be a sampling period of $T_s=1/30,720,000$ seconds). Time resources may be organized according to radio frames having a length, such as for example 10 ms ($T_f=307200T_s$), which may be identified by a system frame number (SFN), for example having a range from 0 to 1023. Each frame may include a number of subframes, such as for example ten 1 ms subframes numbered from 0 to 9. A subframe may be further divided into slots, such as for example two 0.5 ms slots, each of which may contain a number of modulation symbol periods (depending on the length of the cyclic prefix prepended to each symbol). Excluding the cyclic prefix, each symbol contains sample periods, such as for example 2048 sample periods. In some aspects the subframe may be the smallest scheduling unit, also known as a TTI. In other aspects, a TTI may be shorter than a subframe or may be dynamically selected (e.g., in short TTI bursts or in selected component carriers using short TTIs).

A resource element may consist of one symbol period and one subcarrier (e.g., a 15 KHz frequency range). A resource block may contain 12 consecutive subcarriers in the frequency domain and, for a normal cyclic prefix in each orthogonal frequency-division multiplexing (OFDM) symbol, 7 consecutive OFDM symbols in the time domain (1 slot), or 84 resource elements. The number of bits carried by each resource element may depend on the modulation scheme (the configuration of symbols that may be selected during each symbol period). Thus, the more resource blocks that a UE receives and the higher the modulation scheme, the higher the data rate may be.

Wireless communications system 100 may support operation on multiple cells or carriers, a feature that may be referred to as carrier aggregation (CA) or multi-carrier operation. A carrier may also be referred to as a component carrier (CC), a layer, a channel, etc. The terms "carrier," "component carrier," "cell," and "channel" may be used interchangeably herein. A UE 115 may be configured with multiple downlink CCs and one or more uplink CCs for carrier aggregation. Carrier aggregation may be used with both frequency division duplexing (FDD) and time division duplexing (TDD) component carriers.

In some aspects, wireless communications system 100 may utilize enhanced component carriers (eCCs). An eCC may be characterized by one or more features including: wider bandwidth, shorter symbol duration, shorter TTIs, and modified control channel configuration. In some aspects, an eCC may be associated with a carrier aggregation configuration or a dual connectivity configuration (e.g., when multiple serving cells have a suboptimal or non-ideal backhaul link). An eCC may also be configured for use in unlicensed spectrum or shared spectrum (where more than one operator is allowed to use the spectrum). An eCC characterized by wide bandwidth may include one or more segments that may be utilized by UEs 115 that are not capable of monitoring the whole bandwidth or prefer to use a limited bandwidth (e.g., to conserve power).

In some aspects, an eCC may utilize a different symbol duration than other CCs, which may include use of a reduced symbol duration as compared with symbol durations of the other CCs. A shorter symbol duration may be associated with increased subcarrier spacing. A TTI in an eCC may consist of one or multiple symbols. In some aspects, the TTI duration (that is, the number of symbols in a TTI) may be variable. In some aspects, an eCC may utilize a different symbol duration than other CCs, which may include use of a reduced symbol duration as compared with symbol durations of the other CCs. A shorter symbol duration is associated with increased subcarrier spacing. A device, such as a UE 115 or base station 105, utilizing eCCs may transmit wideband signals (e.g., 20, 40, 60, 80 Mhz, etc.) at reduced symbol durations (e.g., 16.67 microseconds). A TTI in eCC may consist of one or multiple symbols. In some aspects, the TTI duration (that is, the number of symbols in a TTI) may be variable.

In some aspects, wireless communications system 100 may utilize both licensed and unlicensed radio frequency spectrum bands. For example, wireless system 100 may employ LTE License Assisted Access (LTE-LAA) or LTE Unlicensed (LTE U) radio access technology or NR technology in an unlicensed band such as the 5 Ghz Industrial, Scientific, and Medical (ISM) band. When operating in unlicensed radio frequency spectrum bands, wireless devices such as base stations 105 and UEs 115 may employ listen-before-talk (LBT) procedures to ensure the channel is clear before transmitting data. In some aspects, operations in unlicensed bands may be based on a CA configuration in conjunction with CCs operating in a licensed band. Operations in unlicensed spectrum may include downlink transmissions, uplink transmissions, or both. Duplexing in unlicensed spectrum may be based on FDD, TDD or a combination of both.

Figure 2:
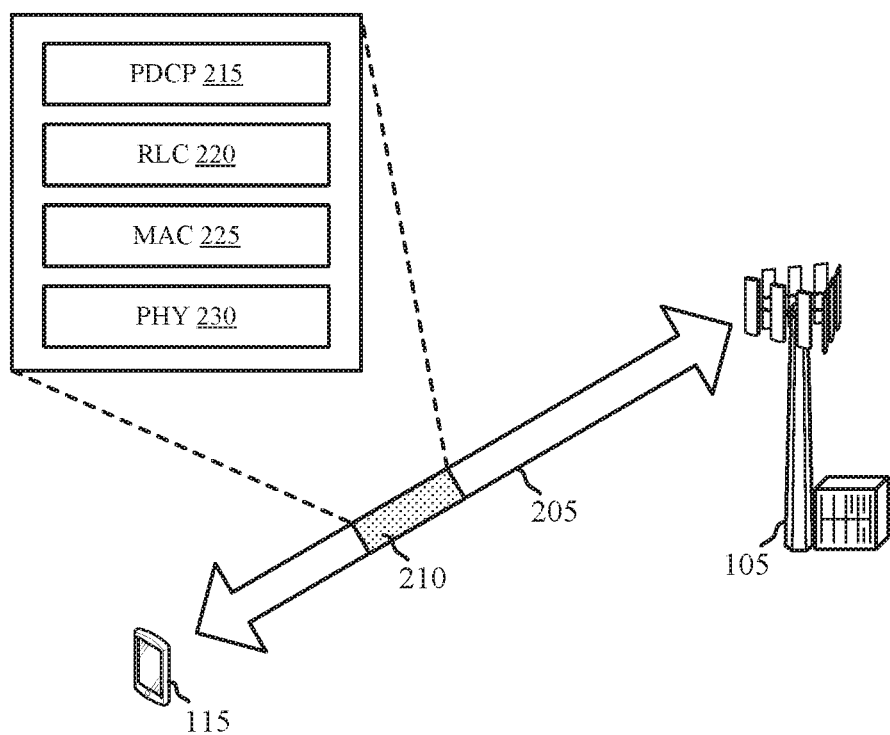
FIG. 2 illustrates an example of a wireless communication system that supports techniques for securing a PDCP control PDU in accordance with aspects of the present disclosure.

FIG. 2 illustrates an example of a wireless communication system 200 for techniques for securing a PDCP control PDU. The wireless communication system 200 may be an example of the wireless communications system 100 discussed with reference to FIG. 1. The wireless communication system 200 may include a base station 105-*a* and a UE 115-*a*. As discussed above, the term base station 105 may refer to an access network entity. While only a single base station 105-*a* and a single UE 115-*a* are depicted, the wireless communication system 200 may include additional base stations 105 and additional UEs 115. The base station 105-*a* may be an example of the base stations 105 described with reference to FIG. 1. The UE 115-*a* be an example of the UEs 115 described with reference to FIG. 1.

The base station 105-*a* and the UE 115-*a* may exchange a plurality of transmissions 205 via a communication link 125. Transmissions 205 may be transmitted or received by either entity, the base station 105-*a* or the UE 115-*a*. An entity (e.g., the base station 105-*a* or the UE 115-*a*) may perform a verification procedure to verify that a transmission 205 was received properly. For example, during a verification procedure, the UE 115-*a* may attempt to decode data included in a transmission 205 received from the base station 105-*a*. If the received transmission is not successfully decoded, the UE 115-*a* may transmit a retransmission request to the base station 105-*a* requesting that the base station 105-*a* retransmit the transmission. In some examples, a retransmission request may be an ARQ or HARQ.

The transmissions 205 may include packets 210 of data. Each packet 210 may be formed of a number of layers. For example, a packet 210 may include a PDCP layer 215, a RLC layer 220, a MAC layer, and/or a PHY layer 225. As packets 210 are generated and/or decoded, operations are performed at each of the layers to ensure the packets 210 reach their destinations successfully.

In some examples, retransmission requests may be generated at the RLC layer 220. Because security in some wireless communication systems may be performed at the PDCP layer 215, the retransmission requests generated at the RLC layer 220 may not be protected using a security configuration. In other examples, a packet 210 may not include an RLC layer 220. In such examples, the functions performed by the RLC layer 220 may be distributed to other layers such as, for example, the PDCP layer 215.

In some examples, retransmission requests may be generated at the PDCP layer 215. In these instances, a PDCP control PDU may include the retransmission request. A PDCP control PDU may be generated and transmitted by either the base station 105-a or the UE 115-a. The PDCP control PDU may be a PDCP status report or a PDCP interspersed ROHC feedback packet. Because the PDCP control PDU is generated at the PDCP layer security configurations may be applied to the PDCP control PDU.

A variety of security procedures may be used to determine whether security configurations should be applied to the PDCP control PDU. In one aspect, the base station 105-a may perform security procedures to determine whether security configurations should be applied to the PDCP control PDUs transmitted by the UE 115-a. In one aspect, the base station 105-a may determine security parameters and/or protections keys associated with the security configuration. Additionally or alternatively, the base station 105-a may determine a control PDU security type associated with the PDCP control PDU.

In one aspect, the base station 105-a may generate messages to the UE 115-a that include the security configuration for PDCP control PDUs. The UE 115-a or the base station 105-a may secure the PDCP control PDUs according to the security configuration. In some multi-communication link scenarios, the base station 105-a may manage and transfer security configurations, security parameters, or protection keys between communication links. Examples of multi-communication link scenarios may include handover procedures and dual connectivity procedures.

Figure 3:
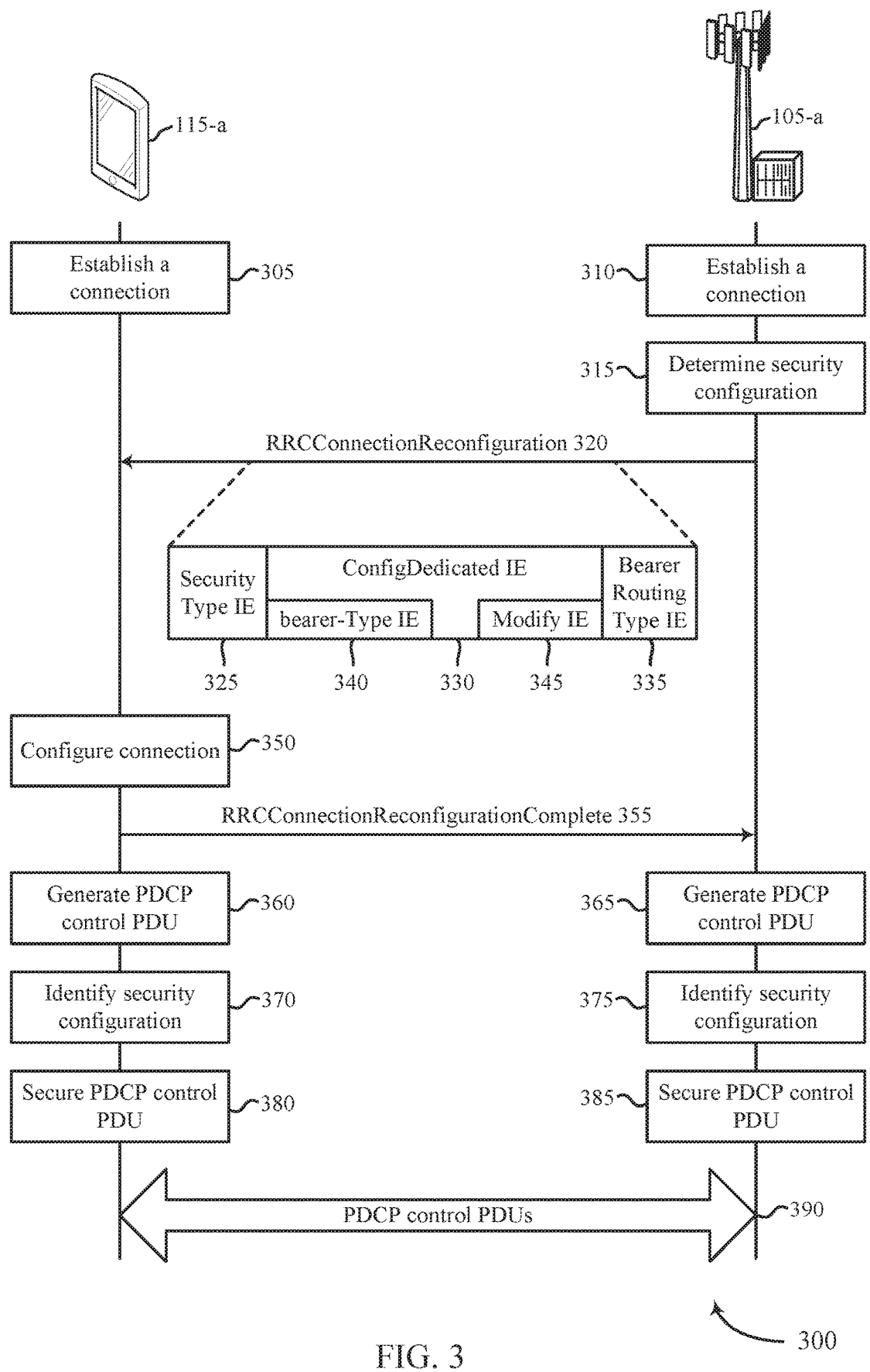
FIG. 3 illustrates an example of a process flow that supports techniques for securing a PDCP control PDU in accordance with aspects of the present disclosure.

FIG. 3 illustrates an example of a process flow 300 for techniques for securing a PDCP control PDU. The process flow 300 may be used to determine and communicate security configurations for PDCP control PDUs between entities (e.g., UE 115-a and 105-a).

At blocks 305 and 310 a connection between the UE 115-a and the base station 105-a may be established. Either entity may initiate the connection. In some examples, the UE 115-a may initiate access procedures to establish a connection with the base station 105-a. In other examples, the base station 105-a may initiate access procedures to establish the connection with the UE 115-a.

As used in the present disclosure, the term "connection" may refer to any ability of one entity (e.g., UE 115-a or base station 105-a) to communicate data with another entity (e.g., UE 115-a or base station 105-a) via a communication network. A connection may include multiple communication links. Some communication links may be wireless or some communication links may be wired. For example, a connection may include dual connectivity situations involving split-bearers. As another example, a connection may be maintained in the event of an intra-base station handover. For instance, a base station 105-a may maintain a plurality of TRPs in a coverage area 110. For example, a TRP may correspond to a wireless direction beam that serves a limited geographic area and may be formed by phased-array antennas and beam-forming techniques. In the event that a UE 115-a is handed-over from a source TRP to a target TRP, the connection between the base station 105-a and the UE 115-a may be maintained. As yet another example, a connection may include a first communication link established using a first RAT and a second communication link established using a second RAT different from the first RAT.

At block 315, the base station 105-a may determine a security configuration associated with a communication link between the UE 115-a and the base station 105-a. The security configuration may indicate whether a PDCP control PDU should be secured. In addition, the security configuration may include data and information related to securing the PDCP control PDU and/or instructions that configure the UE 115-a to enable or disable PDCP control PDU security. In one aspect, the base station 105-a may perform security procedures to determine the security configuration. In some examples, the functions and operations of block 315 may be performed by UE 115-a.

In one aspect, the security configuration may include a security status, a type of security, a security parameter, a protection key, a key derivation method, context data, or any combination thereof. The security status may indicate whether PDCP control PDUs may be secured in general. The type of security may indicate what type of protection procedures should be applied to the PDCP control PDUs. For example, types of security may include integrity protection, ciphering protection, or combinations thereof. The security parameter may include any data used to secure the PDCP control PDU. For example, the security parameter may include a counter associated with PDCP control PDUs. The protection key may include keys used to apply security protection to PDCP control PDUs. For example, a protection key may be an integrity protection key, an encryption key, or combinations thereof. The context data may include information related to the UE 115-a, the base station 105-a, the connection, the communication link, other information, or combinations thereof.

The base station 105-a may determine the security configuration for PDCP control PDUs based on various factors related to the communication link. For instance, the base station 105-a may determine whether the PDCP control PDUs include data that should be secured. In some examples, the PDCP control PDU may include a retransmission request (e.g., ARQ) and, therefore, may need to be protected. In other examples, the PDCP control PDU may not include data that should be protected. In some examples, the base station 105-a or the UE 115 may determine whether the PDCP control PDU is a PDCP status PDU and base the security configuration on the determining. In some examples, the PDCP status PDU may be used for ARQ.

In some examples, the base station 105-a or the UE 115 may determine whether the PDCP control PDU is a ROHC feedback packet and base the security configuration on the determining. In some instances, the base station 105-a may determine which layer is generating a retransmission request. For example, if the PDCP layer is generating a retransmission request, the base station 105-a may determine that security should be applied to PDCP control PDUs. On the other hand, if the RLC layer is generating the retransmission request, the base station 105-a may determine that PDCP security should not be applied to PDCP control PDUs.

In some instances, the base station 105-a may determine the RAT being employed by a communication link (e.g., connection on a wireless communication link) between the UE 115-a and the base station 105-a. Based on the type of RAT being used, the base station 105-a may determine the security parameters. For example, in some radio access technologies, the PDCP control PDU may not be protected.

In some examples, determining a security configuration may include modifying previously determined security configurations or initializing new security configurations based on the previous security configurations. Accordingly, the base station 105-*a* may determine a security configuration associated with the connection and generate a new security configuration associated with the connection based on the determined security configuration. As part of these procedures, the base station 105-*a* may modify any part of the security configuration including the security parameter, the protection key, or other aspects of the security configuration. Such a modification may include incrementing the security parameter, such as a counter. The base station 105-*a* may modify security configurations based at least in part on identifying new communication links between the base station 105-*a* and the UE 115-*a*. In some instances, the base station 105-*a* may generate a new security configuration based on a modified version of a previous security configuration.

The base station 105-*a* may generate and transmit a message (e.g., message 320) including the security configuration associated with PDCP control PDUs to the UE 115-*a*. The message 320 may be an example of a RRC connection reconfiguration message 320.

The message 320 may include a number of IEs related to the security configuration. For example, the message 320 may include, among other IEs, a security type IE 325 (e.g., ControlPDUSecurityType IE), a configuration dedicated IE 330 (e.g., RadioResourceConfigDedicated IE), a bearer routing type IE 335 (e.g., BearerRoutingType IE), a bearer-type IE 340 (e.g., bearer-Type IE), and/or a modify IE 345 (e.g., drb-ToAddModList IE).

The modify IE 345 may be configured to indicate a bearer type for a corresponding data radio bearer (DRB). Based on the bearer type, the UE 115-*a* may determine the security protection to be applied to the DRB or the PDCP control PDU associated with the DRB. In some examples, PDCP control PDU protection may be configured for each DRB. Each DRB may be associated with a separate PDCP instance. For example, the security type IE 325 may be set by the modify IE 345.

In some examples, the bearer type may indicate whether data for the DRB may be routed via a cellular RAT only (e.g., LTE) or a WLAN RAT only (e.g., Wi-Fi and related standards). In such examples, the data may include information related to bearer selection or a RLC aggregation connection type. In such examples, the bearer type may indicate whether the DRB may be routed over both a cellular RAT or a WLAN RAT for a RLC aggregation connection type.

The bearer-type IE 340 and/or the modify IE 345 may be part of the configuration dedicated IE 330. The configuration dedicated IE 330 may be configured to setup, modify, or release radio bearers, among other things. The configuration dedicated IE 330 may be sent as part of the radio bearer configuration in the message 320.

At block 350, upon receiving the message 320, the UE 115-*a* may configure settings associated with the connection according to information included in the message 320. Upon receiving the modify IE, the UE 115-*a* may execute a number of procedures.

For example, for each bearer identity value (e.g., drb-Identity value) not included in the modify IE 345, the UE 115-*a* may determine whether the bearer identity value is part of the current UE configuration.

Subsequently, if the UE 115-*a* determines that the bearer identity values are not included in the current UE configuration, the UE 115-*a* may perform the following functions.

For example, the UE 115-*a* may determine whether the modify IE 345 includes the bearer-type IE 340.

If the UE 115-*a* determines that the modify IE 345 includes the bearer-type IE 340, the UE 115-*a* may set or reconfigure the bearer routing type IE 335 based on the bearer-type IE 340, where the bearer-type IE 340 may identify a security configuration to be applied to a PDCP control PDU or to a radio bearer. For example, the UE 115-*a* may reconfigure the bearer routing type IE 335 for the new bearer identity values by establishing the security configuration of the radio bearers and the PDCP control PDUs based on the bearer-type IE 340.

Alternatively, if the modify IE 345 does not include the bearer-type IE 340, in one aspect, the UE 115-*a* may establish a radio bearer and/or a PDCP control PDU without a security configuration. For instance, the UE 115-*a* may establish a radio bearer according to an LTE protocol. In one aspect, if the message 320 (and/or the modify IE 345, which may be included by the message 320) does not include a bearer-type IE 340, the UE 115-*a* may establish the security configurations according to some values.

Once the UE 115-*a* determines that the configuration process is complete, the UE 115-*a* may transmit a message 355 indicating that the configuration process is complete. The message 355 may be an example of a RRCConnectionReconfigurationComplete message 355. After configuring the connection, the UE 115-*a* and the base station 105-*a* may exchange communications, including, in some instances, PDCP control PDUs.

At blocks 360, 365, either the UE 115-*a* or the base station 105-*a* may generate a PDCP control PDU. The PDCP control PDU may be based on the connection and/or a security configuration associated with the connection. The PDCP control PDU may be generated based on the particular communication needs of the entities involved.

At blocks 370, 375, either the UE 115-*a* or the base station 105-*a* may identify a security configuration associated with a PDCP control PDU. For example, the UE 115-*a* or the base station 105-*a* may receive the security configuration via a RRC message (e.g., message 320). The UE 115-*a* or the base station 105-*a* may identify either the security type IE 325 or the modify IE 345 to determine the security configuration. The UE 115-*a* or the base station 105-*a* may generate the security type IE 325 or the modify IE 345 for the RRC message based on the security configuration.

At blocks 380, 385, either the UE 115-*a* or the base station 105-*a* may secure the PDCP control PDU 390 based on the security configuration. In some examples, the security configuration may indicate that the PDCP control PDU 390 is not to be protected. In some examples, the PDCP control PDU 390 may include PDCP control PDU 390 that is secured or PDCP control PDU 390 that is not secured. The PDCP control PDU 390 may be shared between the UE 115-*a* and the base station 105-*a*.

In one aspect, as part of securing the PDCP control PDU 390, either the UE 115-*a* or the base station 105-*a* may derive a protection key for the PDCP control PDU 390 based on a security parameter in the security configuration. In addition or alternatively, as part of securing the PDCP control PDU 390, either the UE 115-*a* or the base station 105-*a* may use a control input parameter for generating a message authentication code based on the security configuration. The control input parameter may indicate whether a PDU for PDCP is a data PDU or a PDCP control PDU 390. In some examples, the control input parameter is a one bit or two bit code indicating whether the PDU is for control or data.

To protect a PDCP control PDU 390, a counter may be used. In some wireless communication systems, PDCP data PDUs may be secured. As part of that securing process, a counter may also be used. The counter associated with the PDCP control PDU 390 may be different from the data PDU counter for a variety of reasons. For example, the protection algorithms may be more robust if separately managed counters are used (i.e., to ensure that for the same key, the same counter value is not used to secure more than one PDU). In other examples, the processing speed may be maintained by separate counters. If a UE 115-a or a base station 105-a uses separately managed counter for data and control PDUs, processing speed may be maintained. Using a commonly-managed counter may reduce the speed with which protection algorithms may be executed. For example, processing times may be reduced by processing security protection (e.g., ciphering, integrity protection or a combination thereof) of PDCP control PDUs and that of PDCP data PDUs separately.

A protection algorithm (whether for integrity protection or ciphering) may include a protection key. The protection key for a protection algorithm for a PDCP control PDU may be selected in a variety of ways. For example, the protection key for a PDCP control PDU may be the same protection key that is associated with the PDCP data PDU or a completely new key may be derived for the PDCP control PDU. When a protection algorithm reuses a data PDU protection key there is no need to derive a new protection key.

The UE 115-a or the base station 105-a may determine or derive protection keys for protection algorithms based on a variety of factors. For example, the protection key (e.g., $K_{Cint}$ for integrity protection or $K_{Cenc}$ for ciphering) for the PDCP control PDU may be derived from a shared key associated with the UE 115-a and the access network entity (e.g., $K_{AN}$, $K_{eNB}$, and/or $K_{gNB}$). In addition, the new protection keys for the PDCP control PDU may be based at least in part on a link counter, context data, or combinations thereof. For example, the new protection key for the PDCP control PDU may be determined based at least in part on Equation 1.

$$K_{Cint}=KDF(K_{AN},Count_L,Context,[OPT])  \quad\quad \text{Equation (1)}$$

In Equation 1, a key derivation function (e.g., HMAC-SHA-256) may be used to generate the new protection key. The $Count_L$ may be an example of the counter associated with the link. The $Count_L$ may be an example of a counter that is initialized during the RRC connection setup (e.g., during the initial establishment of the communication link or the connection between the UE and the access node). The $Count_L$ may be incremented by a certain value (e.g., one) for every change in communication links. The Context field may be a context string such as, for example, "PDCP control PDU ciphering/integrity protection key." The [OPT] field may be an optional parameter such as a communication link identifier. In some examples, the [OPT] field may include a TRP identifier. The protection keys for the PDCP control PDU may be generated by either the UE 115-a or the base station 105-a.

In some examples, the security procedures for protecting PDCP control PDUs by a UE may include: establishing a connection, obtaining a security configuration, deriving protection key(s), generating a PDCP control PDU, determining the security configuration based on what was obtained, and/or protecting the PDCP control PDU based on the security configuration.

Figure 4:
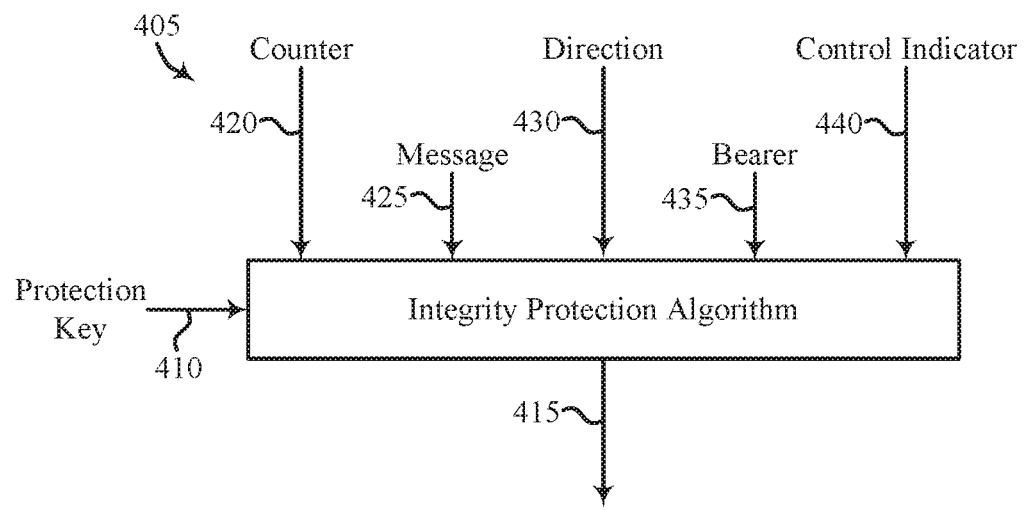
FIG. 4 illustrates an example of an integrity protection algorithm that supports techniques for securing a PDCP control PDU in accordance with aspects of the present disclosure.

FIG. 4 illustrates an example of an integrity protection algorithm 400 for techniques for securing a PDCP control PDU. Based on the security configuration, the UE 115-a or the base station 105-a may apply a variety of different security protections. For example, a PDCP control PDU may be protected using integrity protection, ciphering, or combinations thereof. The integrity protection algorithm 400 may be used to ensure that the message data is not corrupted during communication.

The integrity protection algorithm 400 may use inputs 405 and a protection key 410 to produce an output 415. In some examples, the integrity protection algorithm may produce a message authentication code for Integrity (MAC-I). The inputs 405 of the integrity protection algorithm 400 may include a counter 420, a message 425, a direction 430, a bearer 435, and a control indicator 440. The output 415 may comprise an integrity-protected message.

The protection key 410 may be an example of the protection keys described with reference to FIG. 3. In some examples, the protection key 410 may be a 128 bit key. In other examples, the protection key 410 may be a 256 bit key. As discussed herein, the protection key 410 may be the same protection key that is used for PDCP data PDU integrity protection or it may be a unique protection key derived from a protection key associated with the access network entity.

The counter 420 may be a counter associated with PDCP control PDUs. In some examples, the counter 420 may be associated with a particular communication link between a base station 105-a and a UE 115-a. The counter 420 may be an example of the counter associated with the PDCP control PDUs described above with reference to FIG. 3. The counter 420 may be dedicated to control PDUs (e.g., different from PDCP counters used for PDCP data PDU protection) to ensure that data PDUs and control PDUs are protected differently. In addition, the counter 420 may be dedicated to control PDUs to ensure that processing times are small for protecting both data PDUs and control PDUs. In some examples, the counter 420 may be a 32 bit counter. In some examples, whenever a new link is created, the counter for PDCP control PDU protection is "initialized". This counter may be different from the link counter used for key generation.

In some examples, the message 425 may include a PDCP control PDU. The direction 430 may indicate whether the message being encrypted is for uplink or downlink. For example, the direction 430 may be a one-bit indicator that is a zero for uplink data and is a one for downlink data. In some examples, the bearer 435 includes a bearer identifier associated with radio bearers. The radio bearers may be associated with the PDCP control PDU. In some examples, the bearer 435 may be a five-bit bearer identifier.

The control indicator 440 may indicate whether the message 425 is a PDCP control PDU or a PDCP data PDU. In some aspects, the protection key associated with a PDCP data PDU may be used to protect a PDCP control PDU. In such aspects, the control indicator 440 may be used to differentiate between control PDUs and data PDUs in the integrity protection algorithm. The control indicator 440 may enable the UE 115-a or the base station 105-a to use the same protection keys for the PDCP control PDU as what are used for the PDCP data PDUs. In this manner, using the same protection key may result in protected control data that is different from protected user data. When the protection key 410 is different from a protection key associated with a PDCP data PDU, the inputs 405 may not include the control indicator 440. In some examples, the control indicator 440 may be one-bit long or two-bits long.

Figure 5:
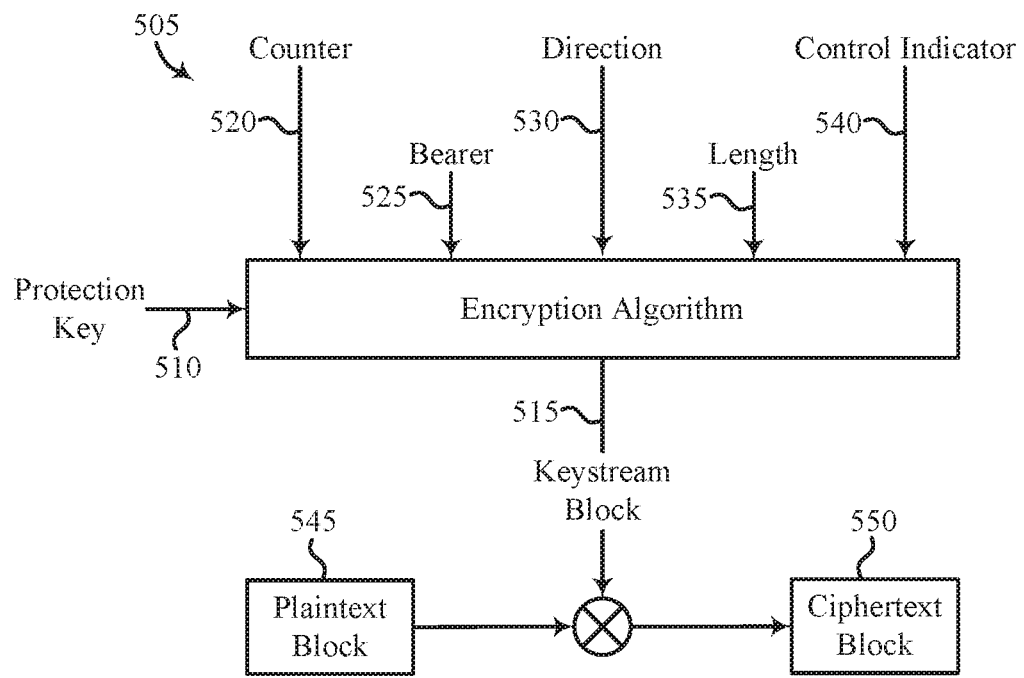
FIG. 5 illustrates an example of an encryption algorithm that supports techniques for securing a PDCP control PDU in accordance with aspects of the present disclosure.

FIG. 5 illustrates an example of an encryption algorithm 500 for techniques for securing a PDCP control PDU. Based on the security configuration, the UE 115-a or the base station 105-a may apply a variety of different security protections. For example, a PDCP control PDU may be protected using integrity protection, ciphering protection, or combinations thereof. In some examples, techniques for securing a PDCP control PDU may involve both the encryption algorithm 500 and the integrity algorithm 400. In some examples, the encryption algorithm 500 may precede the integrity algorithm 400 illustrated in FIG. 4. In some examples, the encryption algorithm 500 may follow the integrity algorithm 400 illustrated in FIG. 4. In some examples, techniques for securing a PDCP control PDU may involve the encryption algorithm 500 but not the integrity algorithm 400, or vice versa. The encryption algorithm 500 may be used so that only authorized parties can read the message that has been encrypted.

The encryption algorithm 500 may include inputs 505, a protection key 510 and outputs 515. In some examples the output 515 may be referred to as key stream block. In some examples, the encryption algorithm may be associated with a MAC-I. The inputs 505 of the encryption algorithm 500 may include a counter 520, a bearer 525, a direction 530, a length 535, and a control indicator 540.

The protection key 510 may be an example of the protection keys described with reference to FIG. 3. In some examples, the protection key 510 may be a 128 bit key. In other examples, the protection key 510 may be a 256 bit key. As discussed herein, the protection key 510 may be the same protection key that is used for PDCP data PDU encryption or it may be a unique protection key derived from a protection key associated with the access network entity.

The counter 520 may be a counter associated with PDCP control PDUs. In some examples, the counter 520 may be associated with a particular communication link between a base station 105-a and a UE 115-a (e.g., a link used to communicate PDCP control PDU 390). The counter 520 may be an example of the counter associated with the PDCP control PDUs described above with reference to FIG. 3. The counter 520 may be dedicated to control PDUs to ensure that data PDUs and control PDUs are protected differently. In addition, the counter 520 may be dedicated to control PDUs to ensure that processing times are small for protecting both data PDUs and control PDUs. In some examples, the counter 520 may be a 32 bit counter.

In some examples, the bearer 525 includes a bearer identifier associated with radio bearers. The radio bearers may be associated with the PDCP control PDU. In some examples, the bearer 525 may be a five-bit bearer identifier. In other examples, the bearer 525 may be more than five-bits. The direction 530 may indicate whether the message being encrypted is for uplink or downlink. For example, the direction 530 may be a one-bit indicator that is a zero for uplink data and is a one for downlink data. The length 535 may indicate a length associated with the encryption algorithm 500. For example, the length 535 may indicate a length of the protection key 510 or a length of the message being encrypted.

The control indicator 540 may indicate whether the message being encrypted is a PDCP control PDU or a PDCP data PDU. In some aspects, the protection key associated with a PDCP data PDU may be used to protect a PDCP control PDU. In such aspects, the control indicator 540 may be used to differentiate between control PDUs and data PDUs in the encryption algorithm. The control indicator 540 may enable the UE 115-a or the base station 105-a to use the same protection keys for the PDCP control PDU as what are used for the PDCP data PDUs. In this manner, using the same protection key may result in protected control data that is different from protected user data. When the protection key 510 is different from a protection key associated with a PDCP data PDU, the inputs 505 may not include the control indicator 540. In some examples, the control indicator 540 may be one-bit long or two-bits long.

The keystream block 515 may be combined with a plaintext block 545 to generate a cipher text block 550. The plaintext block 545 may be an example of the message being encrypted. The process of combining the keystream block 515 with the plaintext block 545 of the message being encrypted may be accomplished in a variety of ways. The cipher text block 550 may be configured to be accessible after a decryption key associated with the encryption key has been used to decode the cipher text block 550.

The encryption algorithm 500 represents an algorithm for encrypting data. The same structure may also be used as part of a decryption algorithm. The differences between an encryption algorithm 500 and the decryption algorithm may be that the cipher text block 550 is combined the keystream block 515. The output of such a combination may be the plaintext block 545. In some examples, a decryption key used by the decryption algorithm may be different from the protection key 510. However, in other examples, the protection keys may be the same.

Figure 6:
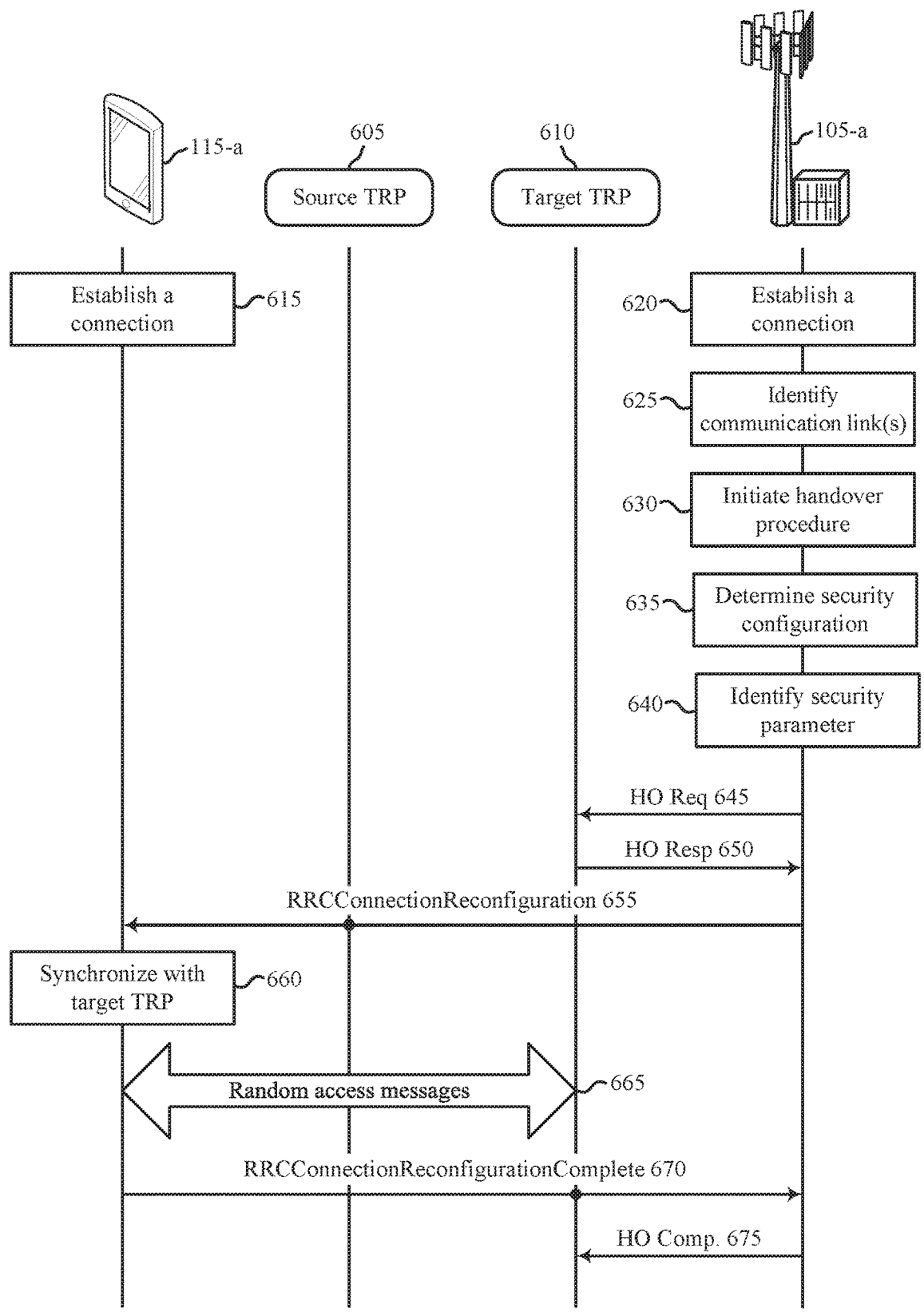
FIG. 6 illustrates an example of a process flow supports techniques for securing a PDCP control PDU in accordance with aspects of the present disclosure.

FIG. 6 illustrates an example of a process flow 600 for techniques for securing a PDCP control PDU. The process flow 600 may be used in connection with securing PDCP control PDUs in the context of intra-access network entity handovers. The process flow 600 describes techniques for securing multiple communication links in the same connection, especially in the context of handover procedures. The process flow 600 may be an example of communications exchanged between an access network entity 105-a, a source TRP 605, a target TRP 610, and a UE 115-a. The source TRP 605 and the target TRP 610 may be part of the access network entity 105-a. In some examples, the access network entity 105-a may be a base station 105-a.

The base station 105-a may maintain a plurality of TRPs in a coverage area 110. A TRP may correspond to a wireless direction beam that serves a limited geographic area and may be formed by phased-array antennas and beam-forming techniques. As a UE 115-a moves through a coverage area, the UE 115-a may need to establish a communication link with another TRP to maintain communications. In an intra-access node handover procedure, a UE 115-a is handed-over from the source TRP 605 to the target TRP 610. During the intra-access node handover procedure, the connection between the base station 105-a and the UE 115-a may be maintained. The operations and functions described herein may be used as part of other handover procedures that are not between TRPs. For example, the procedures described herein may be used in conjunction with an inter-access network entity handover procedure, an inter-base station handover procedure, or any other type of handover procedure.

At blocks 615 and 620, either the UE 115-a or the access network entity 105-a may establish a connection. Blocks 615, 620 may be examples of blocks 305, 310 described with reference to FIG. 3 and may be similarly embodied. The connection between UE 115-a and access network entity 105-a may include a number of communication links.

At block 625, the access network entity 105-a may identify communication links associated with the connection between the UE 115-a and the access network entity 105-a. For example, the access network entity 105-a may identify a first communication link between the source TRP 605 and the UE 115-*a*. The access network entity 105-*a* may also identify a second communication link between the target TRP 610 and the UE 115-*a*. In some examples, it may be determined that the new communication link is associated with a handover procedure. In some example, upon identifying the second communication link, the base station 105-*a* may transmit a security configuration associated with first communication link to the UE 115-*a* to be used in conjunction with the second communication link. In some examples, the functions of block 625 may be performed by the UE 115-*a*.

At block 630, the access network entity 105-*a* may determine that the UE 115-*a* should be handed-over from the source TRP 605 to the target TRP 610. Based on this determination, the access network entity 105-*a* may initiate a handover procedure associated with the UE 115-*a*. Initiating the handover procedure may be based on various factors, including maintaining the connection between the UE 115-*a* and the access network entity 105-*a*. The handover procedure may be an example of an intra-access network entity handover procedure. The handover procedure may be configured to establish a new communication link between the UE 115-*a* and the target TRP 610. In some examples, the handover procedure may terminate a communication link between the UE 115-*a* and the source TRP 605.

At block 635, the access network entity 105-*a* may determine a security configuration. Block 635 may be an example of block 315 described with reference to FIG. 3 and may be similarly embodied. As part of determining the security configuration, at block 640, the access network entity 105-*a* may identify a security parameter (e.g., a counter) associated with the security configuration.

In some examples, the access network entity 105-*a* may initialize a new security configuration or new security parameter (e.g., a counter or a link counter) based on identifying the second communication link. In some examples, the access network entity 105-*a* may modify the security configuration or security parameter associated with the first communication link based on identifying the second communication link and initiating the handover procedure. In these examples, the modified security configuration or modified security parameter may be used in conjunction with the second communication link. In some examples, the counter or link counter may be incremented whenever a link (or TRP) change occurs within the access network entity 105-*a* (e.g., an intra-access network entity handover). In some examples, during an inter-access network entity handover, a new access network entity may initialize a link counter to an initial value, e.g., 0 or 1.

In some instances, a new security parameter may be generated based on a modified version of a previous security parameter. For example, a new security parameter such as a counter may be generated based on executing a handover procedure, and the new security parameter may be associated with a communication link being formed by the handover procedure. The new security parameter (e.g., counter) may be an incremented version of the previous security parameter (e.g., counter).

In one aspect, the access network entity 105-*a* may identify a previous security parameter (e.g., a link counter) associated with the communication link between the UE 115-*a* and the source TRP 605. In some examples, the access network entity 105-*a* may modify (or increase) the previous link counter based on the handover procedure being initiated.

The access network entity 105-*a* may transmit the security configuration or security parameter associated with the second communication link (e.g., the target TRP) to the UE 115-*a* and to the target TRP 610. In some examples, the security configuration or security parameter is a newly initialized one or a modified one. For example, the access network entity 105-*a* may transmit a handover request 645 to the target TRP 610. The handover request 645 may inform the target TRP 610 that a handover procedure has been initialized. The handover request 645 may include the security configuration or the security parameter (e.g., the counter) because the target TRP 610 may perform security protection for PDCP control PDUs. In response to the handover request, the target TRP 610 may transmit a handover response 650 to the access network entity 105-*a* acknowledging that the handover request 645 has been successfully received.

In some examples, the access network entity 105-*a* may generate a message 655 that includes security configuration or the security parameter. The access network entity 105-*a* may transmit the message 655 to the UE 115-*a* and the source TRP 605. The message 655 may be an example of an RRCConnectionReconfiguration message. The message 655 may be an example of message 320 described with reference to FIG. 3 and may be similarly embodied. The message 655 may include new security parameters. In this manner, PDCP control PDUs exchanged between the UE 115-*a* and the target TRP 610 may be protected without generating a completely new protection key for the new communication link. Instead, a security parameter (e.g. the counter) is transferred from communication link associated with the source TRP 605 to a communication link associated with the target TRP 610.

At block 660, the UE 115-*a* may synchronize with the target TRP 610. The synchronization may be based on receiving the message 655 and the contents of the message 655. To synchronize with the target TRP 610, the UE 115-*a* may initiate a random access procedure that may include exchanging random access messages 665 with the target TRP 610. The synchronizing may be performed at any time after receiving the message 655.

Upon completing the synchronization, the UE 115-*a* may generate a message 670. The message 670 may be an example of an RRCConnectionReconfiguration complete message. The message 670 may be an example of the message 355 described with reference to FIG. 3 and may be similarly embodied. The UE 115-*a* may transmit the message 670 to the access network entity 105-*a* and the target TRP 610. The access network entity 105-*a* may transmit a handover complete message 675 to the target TRP 610 upon receiving message 670.

Figure 7:
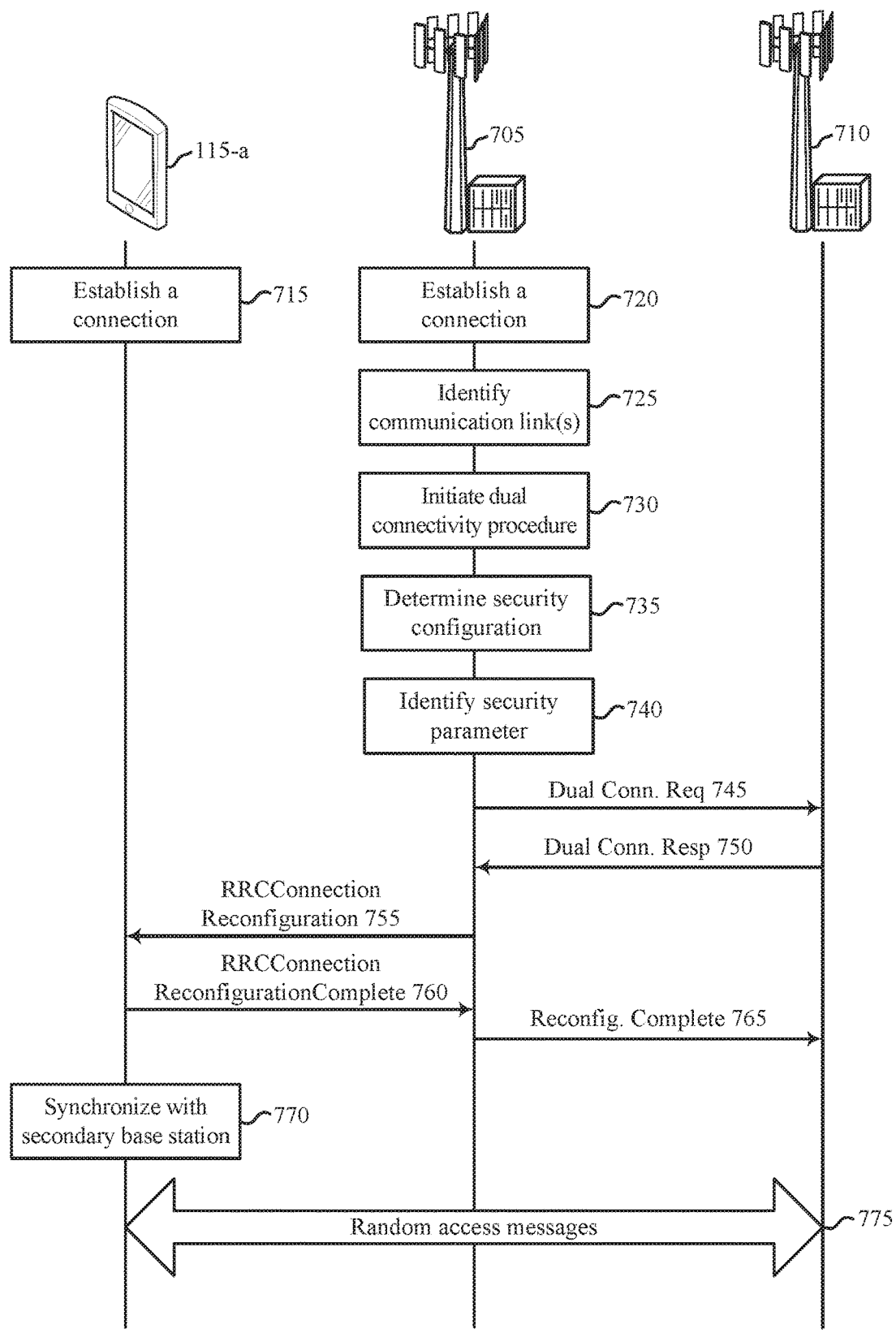
FIG. 7 illustrates an example of a process flow that supports techniques for securing a PDCP control PDU in accordance with aspects of the present disclosure.

FIG. 7 illustrates an example of a process flow 700 for techniques for securing a PDCP control PDU. The process flow 700 may be used in connection with securing PDCP control PDUs in the context of dual connectivity and split bearers. The process flow 700 describes techniques for securing multiple communication links in the same connection, especially in the context of dual connectivity. The process flow 700 may be an example of communications exchanged between master base station 705, a secondary base station 710, and a UE 115-*a*. The master base station 705 and the secondary base station 710 may utilize the same RAT or they may utilize different RATs. The base stations 705, 710 may be examples of the base stations and the access network entities described with reference to FIGS. 1-6.

Blocks 715, 720, 725, 735, and 740 may be examples of blocks 615, 620, 625, 635, and 640 described with reference to FIG. 6 and may be similarly embodied. As such, full descriptions of these blocks are not repeated here. It should be appreciated that references to access network entities and TRPs may be mapped to analogous base stations 705, 710 as appropriate.

At block 730, the master base station 705 may initiate a dual connectivity procedure. The dual connectivity procedure may cause the UE 115-*a* to establish simultaneous communication links with two base stations, the master base station 705 and the secondary base station 710. The first communication link may be between the master base station 705 and the UE 115-*a* and the second communication link may be between the secondary base station 710 and the UE 115-*a*.

Because both communication links will be maintained simultaneously, the master base station 705 may generate/initialize a new security configuration and a new security parameter for the second communication link. The new security configuration and the new security parameter may be based on a security configuration and a security parameter associated with the first communication link. For example, the master base station 705 may identify the counter associated with the first communication link and initialize a new instance of a counter for the second communication link based on the first counter.

The master base station 705 may generate and transmit a dual connectivity request 745 to the secondary base station 710. The request 745 may include the new security configuration and the new security parameter. In this manner, the secondary base station 710 may perform security procedures on PDCP control PDUs exchanged between UE 115-*a* and the secondary base station 710. The secondary base station 710 may transmit a dual connectivity response 750 acknowledging the receipt of the request 745.

The master base station 705 may generate and transmit a message 755 to the UE 115-*a*. The message 755 may be an example of a RRCConnectionReconfiguration message. The message 755 may be an example of the messages 320, 655 described with reference to FIGS. 3 and 6 and may be similarly embodied. The message 755 may include the new security configuration and the new security parameter. In this manner, the UE 115-*a* may perform security procedures on PDCP control PDUs exchanged between UE 115-*a* and the secondary base station 710.

The UE 115-*a* may generate a message 760. The message 760 may be an example of an RRCConnectionReconfiguration complete message. The message 760 may be an example of the messages 355, 670 described with reference to FIGS. 3 and 6 and may be similarly embodied. The UE 115-*a* may transmit the message 760 to the master base station 705. The master base station 705 may transmit a handover reconfiguration complete message 765 to the secondary base station 710 upon receiving message 760.

At block 770, the UE 115-*a* may synchronize with the secondary base station 710. The synchronization may be based on receiving the message 755 and the contents of the message 755. To synchronize with the secondary base station 710, the UE 115-*a* may initiate a random access procedure that may include exchanging random access messages 775 with the secondary base station 710. The synchronizing may be performed at any time after receiving the message 755. Upon completing these procedures, the master base station 705 and the secondary base station 710 may communicate with the core network to establish the split bearer procedures.

Figure 8:
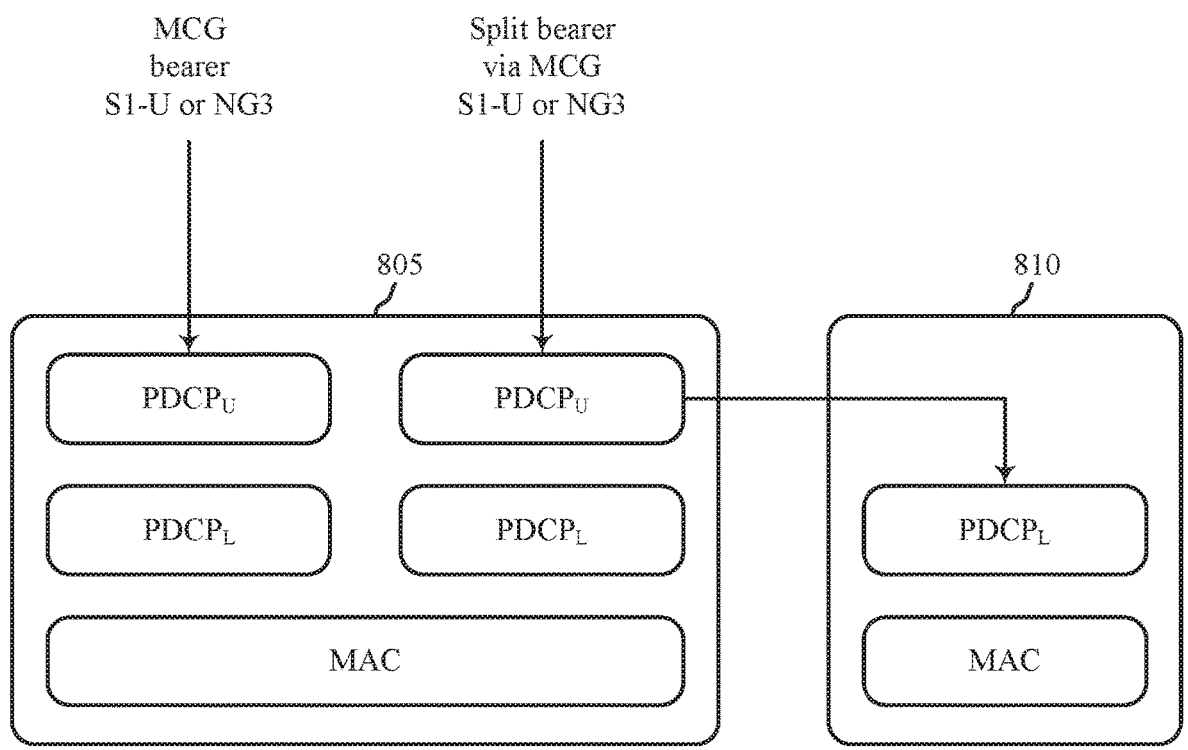
FIG. 8 illustrates an example of a message format that supports techniques for securing a PDCP control PDU in accordance with aspects of the present disclosure.

FIG. 8 illustrates an example of a message format 800 for techniques for securing a PDCP control PDU. The message format 800 may be used in conjunction with the process flow 700 described with reference to FIG. 7. In the aspect of dual connectivity, the PDCP control PDU protection implemented at the master base station 705 may have a separate counter than the PDCP control PDU protection implemented at the secondary base station 710. In some examples, an individual counter may be established for each secondary base station 710 in a dual connectivity context. The message format 800 includes a master message format 805 and a secondary message format 810. The message format 800 shows protocol stacks implemented in a master base station (e.g., MeNB) and a secondary base station (e.g., SeNB). PDCP_U (i.e., upper PDCP protocol stack) may be responsible for PDCP data PDU processing; whereas PDCP_L (i.e., lower PDCP protocol stack) may be responsible for PDCP control PDU processing. In this manner, PDCP control PDU protection may be separately configured at the secondary base station for the split bearer.

Figure 9:
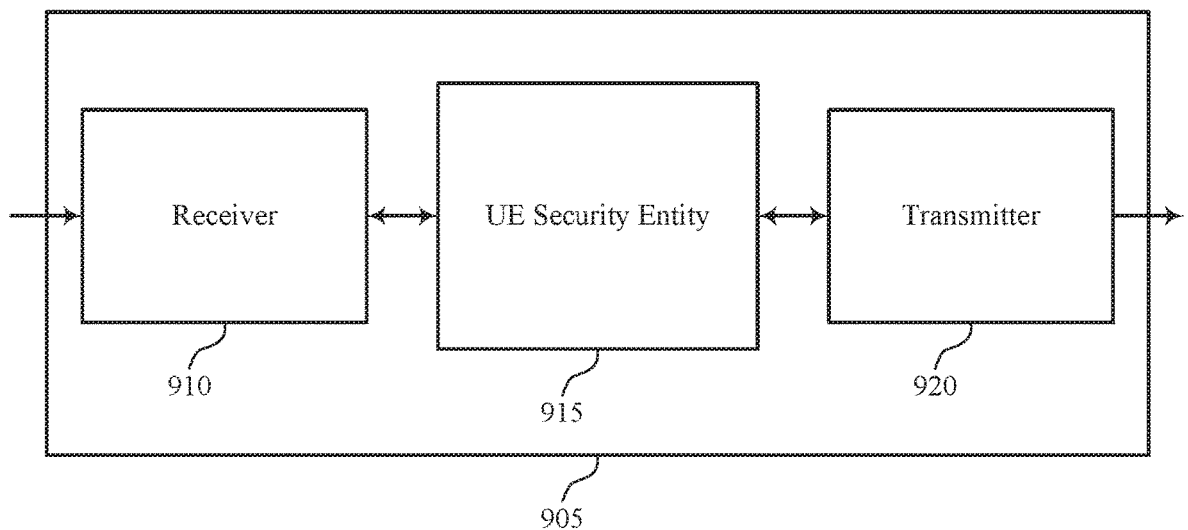
FIGS. 9 through 11 show block diagrams of a device that supports techniques for securing a PDCP control PDU in accordance with aspects of the present disclosure.

FIG. 9 shows a block diagram 900 of a wireless device 905 that supports techniques for securing a PDCP control PDU in accordance with various aspects of the present disclosure. Wireless device 905 may be an example of aspects of UE 115 as described with reference to FIG. 1. Wireless device 905 may include receiver 910, UE security entity 915, and transmitter 920. Wireless device 905 may also include a processor. Each of these components may be in communication with one another (e.g., via one or more buses).

Receiver 910 may receive information such as packets, user data, or control information associated with various information channels (e.g., control channels, data channels, and information related to techniques for securing a PDCP control PDU, etc.). Information may be passed on to other components of the device. The receiver 910 may be an example of aspects of the transceiver 1235 described with reference to FIG. 12.

UE security entity 915 may be an example of aspects of the UE security entity 1215 described with reference to FIG. 12. UE security entity 915 may establish a connection with an access network entity, generate a PDCP control PDU based on the connection, determine a security configuration associated with the PDCP control PDU, and secure the PDCP control PDU based on the security configuration. The UE security entity 915 may also establish a connection between an access network entity and the UE, identify a first communication link associated with the connection, receive a security parameter associated with a second communication link associated with the connection, and secure PDCP control PDU associated with the first communication link based on the security parameter.

Transmitter 920 may transmit signals generated by other components of the device. In some examples, the transmitter 920 may be collocated with a receiver 910 in a transceiver module. For example, the transmitter 920 may be an example of aspects of the transceiver 1235 described with reference to FIG. 12. The transmitter 920 may include a single antenna, or it may include a set of antennas.

Figure 10:
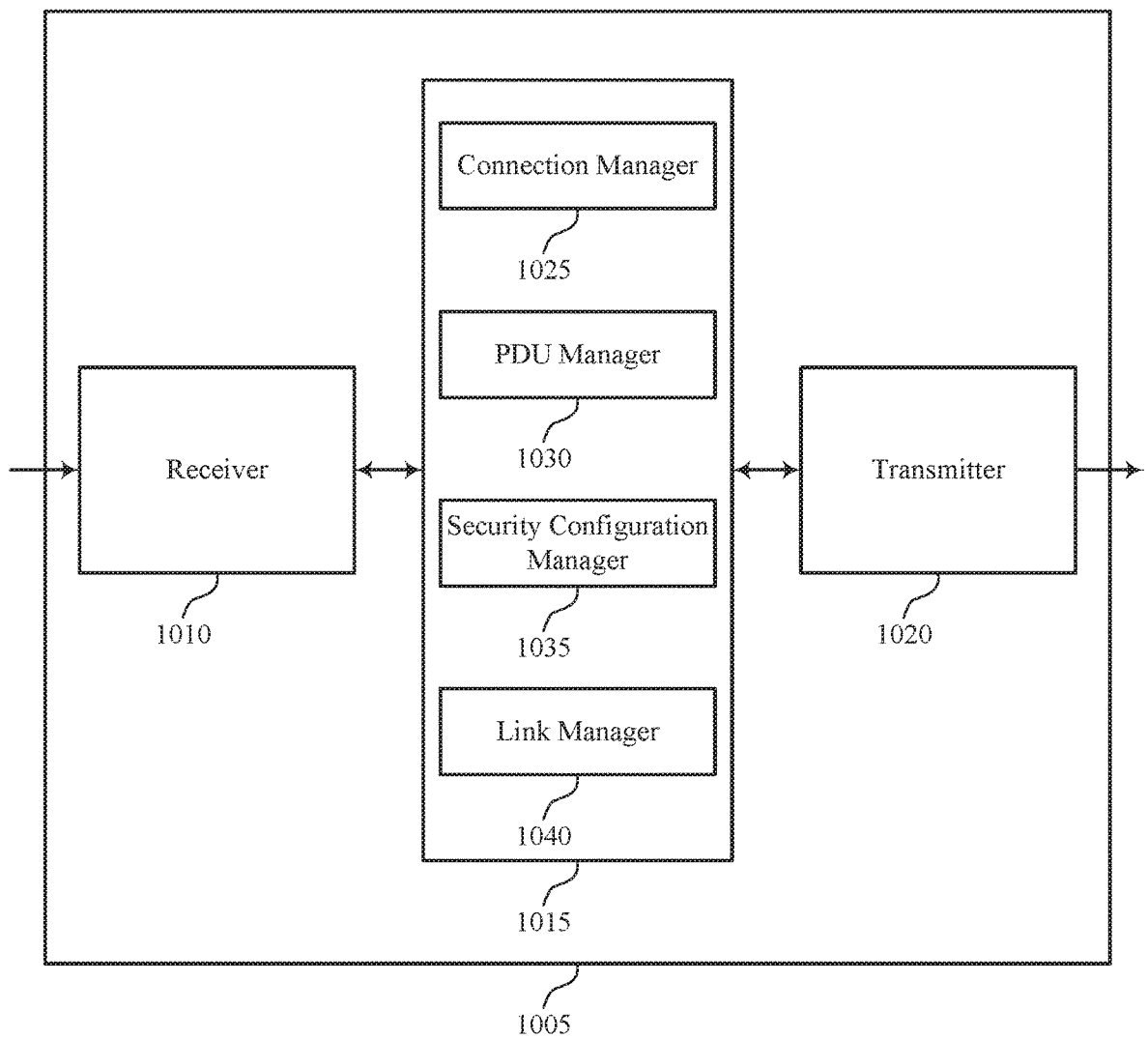

FIG. 10 shows a block diagram 1000 of a wireless device 1005 that supports techniques for securing a PDCP control PDU in accordance with various aspects of the present disclosure. Wireless device 1005 may be an example of aspects of a wireless device 905 or a UE 115 as described with reference to FIGS. 1 and 9. Wireless device 1005 may include receiver 1010, UE security entity 1015, and transmitter 1020. Wireless device 1005 may also include a processor. Each of these components may be in communication with one another (e.g., via one or more buses).

Receiver 1010 may receive information such as packets, user data, or control information associated with various information channels (e.g., control channels, data channels, and information related to techniques for securing a PDCP control PDU, etc.). Information may be passed on to other components of the device. The receiver 1010 may be an example of aspects of the transceiver 1235 described with reference to FIG. 12.

UE security entity 1015 may be an example of aspects of the UE security entity 1215 described with reference to FIG. 12. UE security entity 1015 may also include connection manager 1025, PDU manager 1030, security configuration manager 1035, and link manager 1040.

Connection manager 1025 may establish a connection with an access network entity, receive the security configuration including a security parameter, and establish a connection between an access network entity and the UE. In some aspects, the access network entity includes a base station.

PDU manager 1030 may generate PDCP control PDU based on the connection and secure PDCP control PDU associated with the first communication link based on the security parameter. In some aspects, the PDCP control PDU includes a PDCP status PDU. In some aspects, the PDCP control PDU includes an interspersed ROHC feedback packet.

Security configuration manager 1035 may determine a security configuration associated with the PDCP control PDU, derive a protection key for the PDCP control PDU based on the security parameter, secure the PDCP control PDU based on the security configuration, determine that the PDCP control PDU should be secured based on information contained in the security configuration, where securing the PDCP control PDU is based on the determining, receive a security parameter associated with a second communication link associated with the connection, and generate a protection key based on the security parameter, where securing the PDCP control PDU is based on the protection key. In some aspects, the security parameter includes a second protection key associated with the connection, or a counter associated with the connection, or context data, or some combination thereof. In some aspects, the security parameter includes a counter. Link manager 1040 may identify a first communication link associated with the connection.

Transmitter 1020 may transmit signals generated by other components of the device. In some examples, the transmitter 1020 may be collocated with a receiver 1010 in a transceiver module. For example, the transmitter 1020 may be an example of aspects of the transceiver 1235 described with reference to FIG. 12. The transmitter 1020 may include a single antenna, or it may include a set of antennas.

Figure 11:
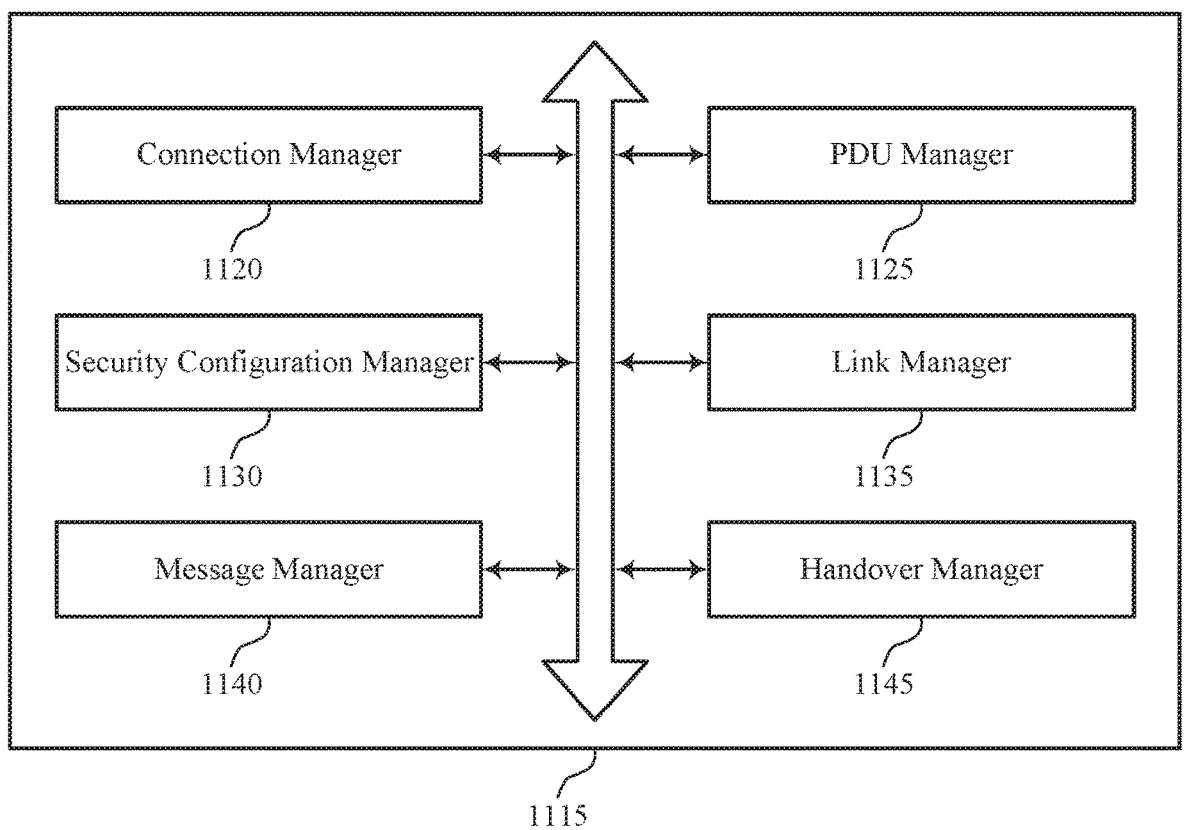

FIG. 11 shows a block diagram 1100 of a UE security entity 1115 that supports techniques for securing a PDCP control PDU in accordance with various aspects of the present disclosure. The UE security entity 1115 may be an example of aspects of a UE security entity 915, a UE security entity 1015, or a UE security entity 1215 described with reference to FIGS. 9, 10, and 12. The UE security entity 1115 may include connection manager 1120, PDU manager 1125, security configuration manager 1130, link manager 1135, message manager 1140, and handover manager 1145. Each of these modules may communicate, directly or indirectly, with one another (e.g., via one or more buses).

Connection manager 1120 may establish a connection with an access network entity, receive the security configuration including a security parameter, and establish a connection between an access network entity and the UE. In some aspects, the access network entity includes a base station.

PDU manager 1125 may generate PDCP control PDU based on the connection and secure PDCP control PDU associated with the first communication link based on the security parameter. In some aspects, the PDCP control PDU includes a PDCP status PDU. In some aspects, the PDCP control PDU includes an interspersed ROHC feedback packet.

Security configuration manager 1130 may determine a security configuration associated with the PDCP control PDU, derive a protection key for the PDCP control PDU based on the security parameter, secure the PDCP control PDU based on the security configuration, determine that the PDCP control PDU should be secured based on information contained in the security configuration, where securing the PDCP control PDU is based on the determining, receive a security parameter associated with a second communication link associated with the connection, and generate a protection key based on the security parameter, where securing the PDCP control PDU is based on the protection key. In some aspects, the security parameter includes a second protection key associated with the connection, or a counter associated with the connection, or context data, or some combination thereof. In some aspects, the security parameter includes a counter. Link manager 1135 may identify a first communication link associated with the connection.

Message manager 1140 may generate a control input parameter for a message authentication code based on the security configuration, the control input parameter indicating whether an associated PDU is the PDCP control PDU, generate a security IE for a RRC message, the security IE based on the security configuration, where the security configuration is obtained from a security IE in an RRC message received from the access network entity, receive a RRC connection reconfiguration message from the access network entity, and receive a RRC connection reconfiguration message indicating a status from the access network entity. In some aspects, the security IE indicates a type of security, or security algorithms, or a combination thereof. Handover manager 1145 may receive a handover command from the access network entity.

Figure 12:
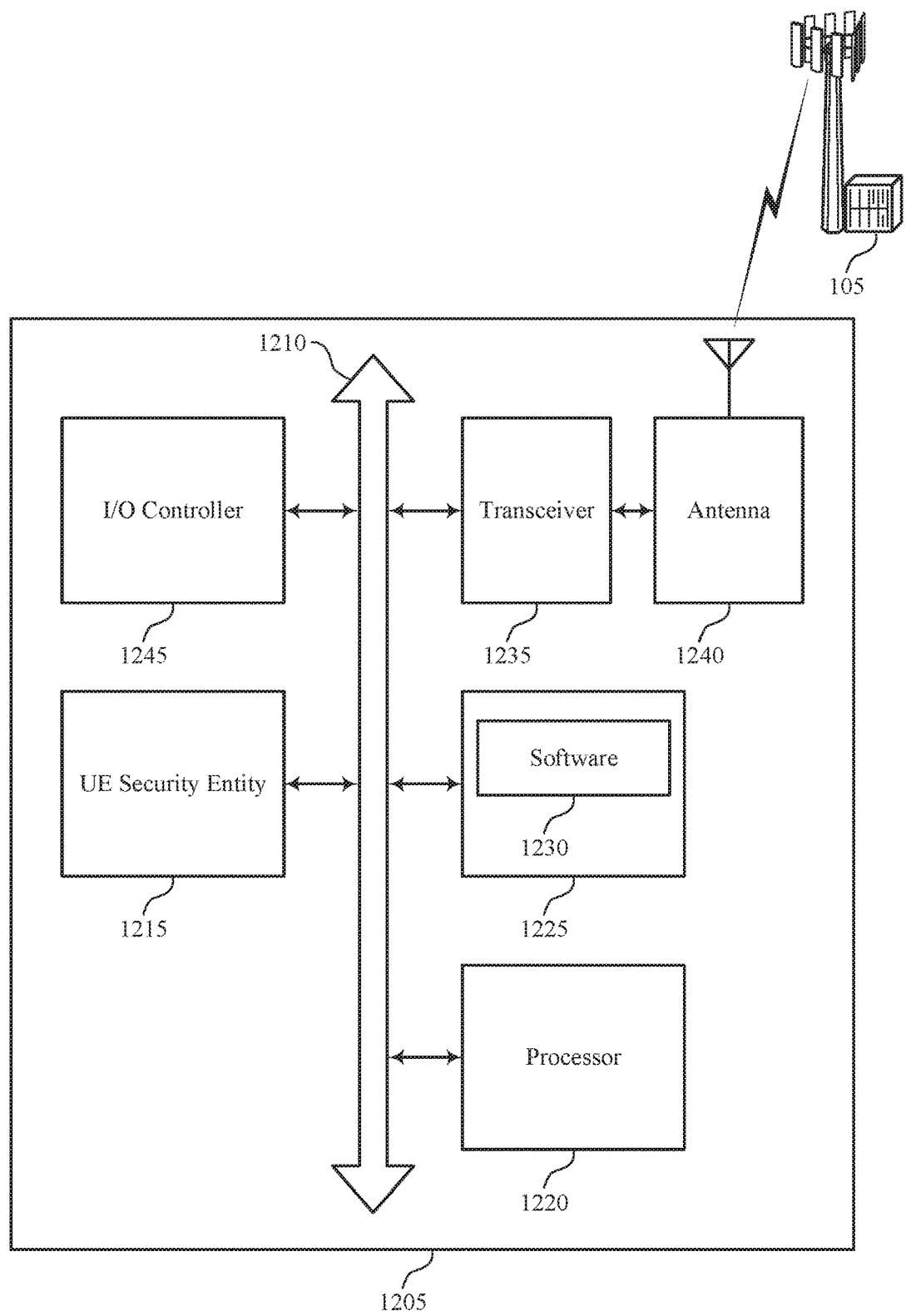
FIG. 12 illustrates a block diagram of a system including a UE that supports techniques for securing a PDCP control PDU in accordance with aspects of the present disclosure.

FIG. 12 shows a diagram of a system 1200 including a device 1205 that supports techniques for securing a PDCP control PDU in accordance with various aspects of the present disclosure. Device 1205 may be an example of or include the components of wireless device 905, wireless device 1005, or a UE 115 as described above, e.g., with reference to FIGS. 1, 9 and 10. Device 1205 may include components for bi-directional voice and data communications including components for transmitting and receiving communications, including UE security entity 1215, processor 1220, memory 1225, software 1230, transceiver 1235, antenna 1240, and I/O controller 1245. These components may be in electronic communication via one or more busses (e.g., bus 1210). Device 1205 may communicate wirelessly with one or more base stations 105.

Processor 1220 may include an intelligent hardware device, (e.g., a general-purpose processor, a digital signal processor (DSP), a central processing unit (CPU), a microcontroller, an application-specific integrated circuit (ASIC), an field-programmable gate array (FPGA), a programmable logic device, a discrete gate or transistor logic component, a discrete hardware component, or any combination thereof). In some aspects, processor 1220 may be configured to operate a memory array using a memory controller. In other aspects, a memory controller may be integrated into processor 1220. Processor 1220 may be configured to execute computer-readable instructions stored in a memory to perform various functions (e.g., functions or tasks supporting techniques for securing a PDCP control PDU).

Memory 1225 may include random access memory (RAM) and read only memory (ROM). The memory 1225 may store computer-readable, computer-executable software 1230 including instructions that, when executed, cause the processor to perform various functions described herein. In some aspects, the memory 1225 may contain, among other things, a basic input/output system (BIOS) that may control basic hardware and/or software operation such as the interaction with peripheral components or devices.

Software 1230 may include code to implement aspects of the present disclosure, including code to support techniques for securing a PDCP control PDU. Software 1230 may be stored in a non-transitory computer-readable medium such as system memory or other memory. In some aspects, the software 1230 may not be directly executable by the processor but may cause a computer (e.g., when compiled and executed) to perform functions described herein.

Transceiver 1235 may communicate bi-directionally, via one or more antennas, wired, or wireless links as described above. For example, the transceiver 1235 may represent a wireless transceiver and may communicate bi-directionally with another wireless transceiver. The transceiver 1235 may also include a modem to modulate the packets and provide the modulated packets to the antennas for transmission, and to demodulate packets received from the antennas. In some aspects, the wireless device may include a single antenna 1240. However, in some aspects the device may have more than one antenna 1240, which may be capable of concurrently transmitting or receiving multiple wireless transmissions.

I/O controller 1245 may manage input and output signals for device 1205. I/O controller 1245 may also manage peripherals not integrated into device 1205. In some aspects, I/O controller 1245 may represent a physical connection or port to an external peripheral. In some aspects, I/O controller 1245 may utilize an operating system such as iOS®, ANDROID®, MS-DOS®, MS-WINDOWS®, OS/2®, UNIX®, LINUX®, or another known operating system.

Figure 13:
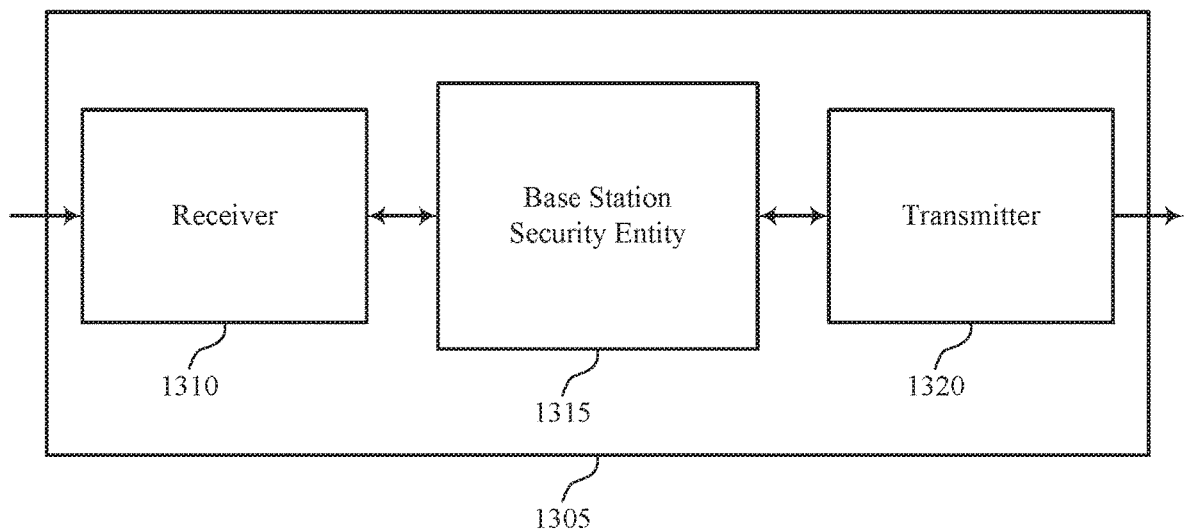
FIGS. 13 through 15 show block diagrams of a device that supports techniques for securing a PDCP control PDU in accordance with aspects of the present disclosure.

FIG. 13 shows a block diagram 1300 of a wireless device 1305 that supports techniques for securing a PDCP control PDU in accordance with various aspects of the present disclosure. Wireless device 1305 may be an example of aspects of a base station 105 as described with reference to FIG. 1. Wireless device 1305 may include receiver 1310, base station security entity 1315, and transmitter 1320. Wireless device 1305 may also include a processor. Each of these components may be in communication with one another (e.g., via one or more buses).

Receiver 1310 may receive information such as packets, user data, or control information associated with various information channels (e.g., control channels, data channels, and information related to techniques for securing a PDCP control PDU, etc.). Information may be passed on to other components of the device. The receiver 1310 may be an example of aspects of the transceiver 1635 described with reference to FIG. 16.

Base station security entity 1315 may be an example of aspects of the base station security entity 1615 described with reference to FIG. 16. Base station security entity 1315 may establish a connection between the access network entity and a UE and transmit a security parameter to the UE, where the security parameter is configured to secure PDCP control PDU. In some examples, the base station security entity 1315 may identify a first communication link associated with the connection. In these examples, the security parameter may be transmitted based on identifying the first communication link and the PDCP control PDU may be associated with the first communication link.

Transmitter 1320 may transmit signals generated by other components of the device. In some examples, the transmitter 1320 may be collocated with a receiver 1310 in a transceiver module. For example, the transmitter 1320 may be an example of aspects of the transceiver 1635 described with reference to FIG. 16. The transmitter 1320 may include a single antenna, or it may include a set of antennas.

Figure 14:
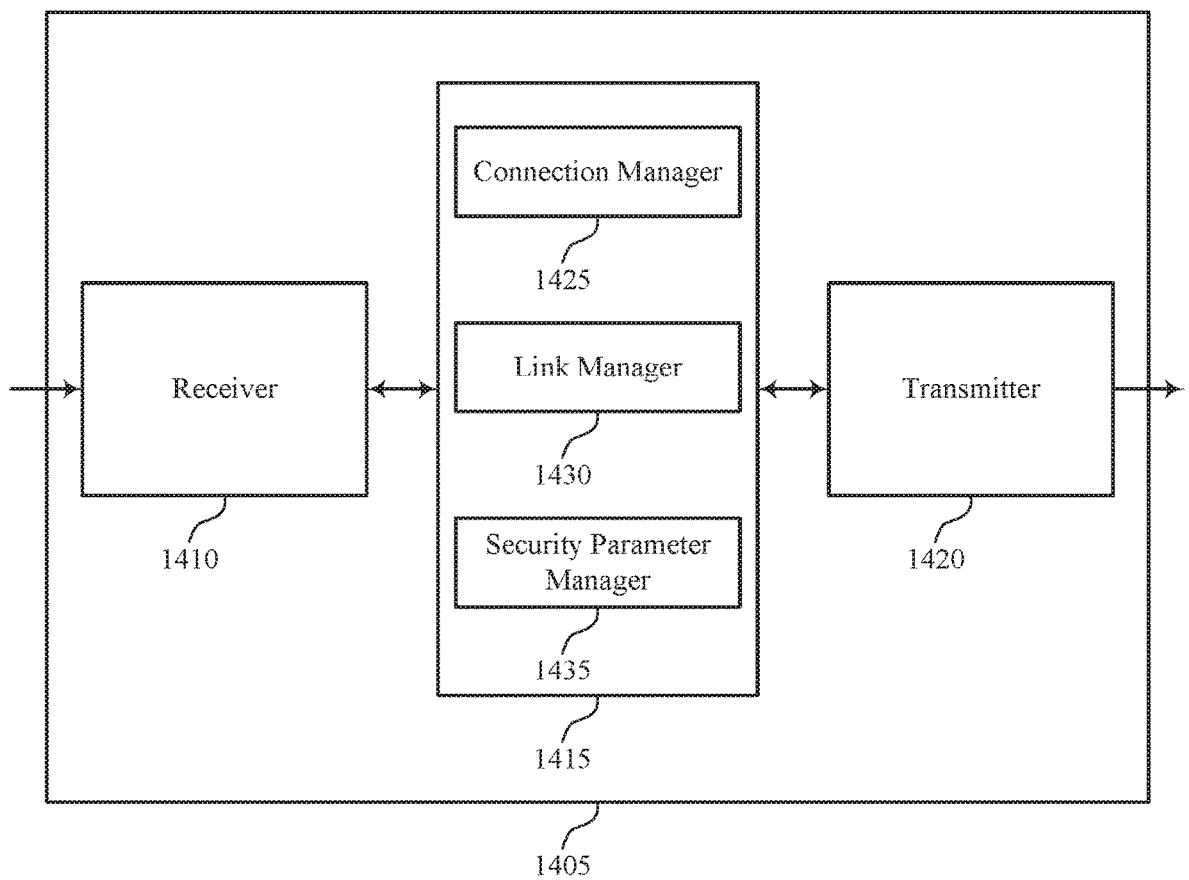

FIG. 14 shows a block diagram 1400 of a wireless device 1405 that supports techniques for securing a PDCP control PDU in accordance with various aspects of the present disclosure. Wireless device 1405 may be an example of aspects of a wireless device 1305 or a base station 105 as described with reference to FIGS. 1 and 13. Wireless device 1405 may include receiver 1410, base station security entity 1415, and transmitter 1420. Wireless device 1405 may also include a processor. Each of these components may be in communication with one another (e.g., via one or more buses).

Receiver 1410 may receive information such as packets, user data, or control information associated with various information channels (e.g., control channels, data channels, and information related to techniques for securing a PDCP control PDU, etc.).

Information may be passed on to other components of the device. The receiver 1410 may be an example of aspects of the transceiver 1635 described with reference to FIG. 16.

Base station security entity 1415 may be an example of aspects of the base station security entity 1615 described with reference to FIG. 16. Base station security entity 1415 may also include connection manager 1425, link manager 1430, and security parameter manager 1435. Connection manager 1425 may establish a connection between the access network entity and a UE.

Link manager 1430 may identify a first communication link associated with the connection. In some aspects, the first communication link is established using a first RAT. In some aspects, the second communication link is established using a second RAT.

Security parameter manager 1435 may transmit a security parameter to the UE based on identifying the first communication link, where the security parameter is configured to secure PDCP control PDU associated with the first communication link, initialize the security parameter based on establishing the connection, modify the security parameter based on a new communication link associated with the connection, modify a second security parameter associated with the second communication link based on the handover procedure, where the security parameter is based on the modified second security parameter, and initialize the security parameter based on the second security parameter. In some aspects, the security parameter includes a counter. In some aspects, transmitting the security parameter further includes: transferring a security configuration associated with a second communication link associated with the connection to the UE based on the identifying. In some aspects, transmitting the security parameter further includes: transmitting, by the second node, a RRC connection reconfiguration message that includes the security parameter and the second security parameter to the UE based on the executing the dual connectivity procedure.

Transmitter 1420 may transmit signals generated by other components of the device. In some examples, the transmitter 1420 may be collocated with a receiver 1410 in a transceiver module. For example, the transmitter 1420 may be an example of aspects of the transceiver 1635 described with reference to FIG. 16. The transmitter 1420 may include a single antenna, or it may include a set of antennas.

Figure 15:
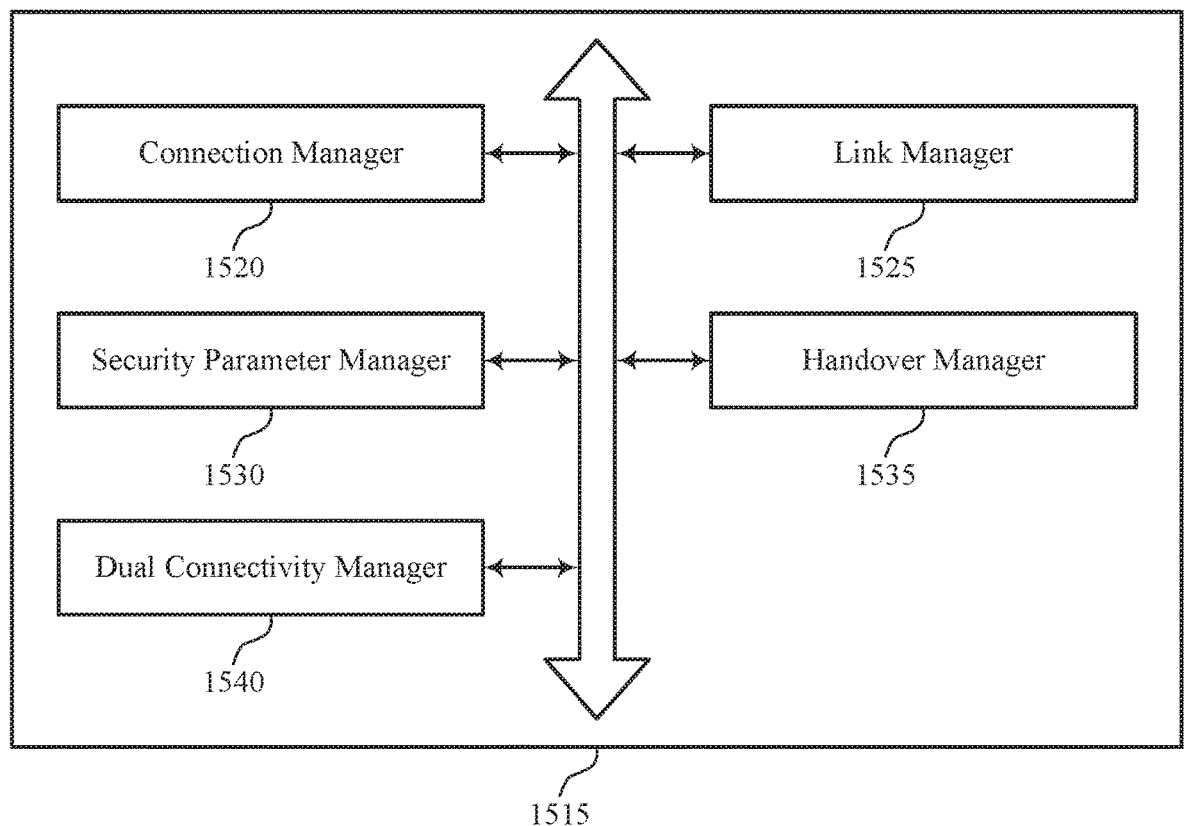

FIG. 15 shows a block diagram 1500 of a base station security entity 1515 that supports techniques for securing a PDCP control PDU in accordance with various aspects of the present disclosure. The base station security entity 1515 may be an example of aspects of a base station security entity 1615 described with reference to FIGS. 13, 14, and 16. The base station security entity 1515 may include connection manager 1520, link manager 1525, security parameter manager 1530, handover manager 1535, and dual connectivity manager 1540. Each of these modules may communicate, directly or indirectly, with one another (e.g., via one or more buses).

Connection manager 1520 may establish a connection between the access network entity and a UE. Link manager 1525 may identify a first communication link associated with the connection. In some aspects, the first communication link is established using a first RAT. In some aspects, the second communication link is established using a second RAT.

Security parameter manager 1530 may transmit a security parameter to the UE based on identifying the first communication link, where the security parameter is configured to secure PDCP control PDU associated with the first communication link, initialize the security parameter based on establishing the connection, modify the security parameter based on a new communication link associated with the connection, modify a second security parameter associated with the second communication link based on the handover procedure, where the security parameter is based on the modified second security parameter, and initialize the security parameter based on the second security parameter. In some aspects, the security parameter includes a counter. In some aspects, transmitting the security parameter further includes: transferring a security configuration associated with a second communication link associated with the connection to the UE based on the identifying. In some aspects, transmitting the security parameter further includes: transmitting, by the second node, a RRC connection reconfiguration message that includes the security parameter and the second security parameter to the UE based on the executing the dual connectivity procedure.

Handover manager 1535 may execute a handover procedure of the UE between a source TRP associated with a second communication link and a target TRP associated with the first communication link and transmit a handover request to the target TRP based on executing the handover procedure. In some aspects, transmitting the security parameter further includes: transmitting a RRC connection reconfiguration message that includes the modified security parameter to the UE based on executing the handover procedure.

Dual connectivity manager 1540 may execute a dual connectivity procedure, where the first communication link is between a first node and the UE and a second communication link associated with the connection is between a second node and the UE, identify a second security parameter associated with the second communication link, and transmit the second security parameter with the security parameter based on executing the dual connectivity procedure and initializing the second security parameter. In some aspects, the second node is a master node and the first node is a secondary node.

Figure 16:
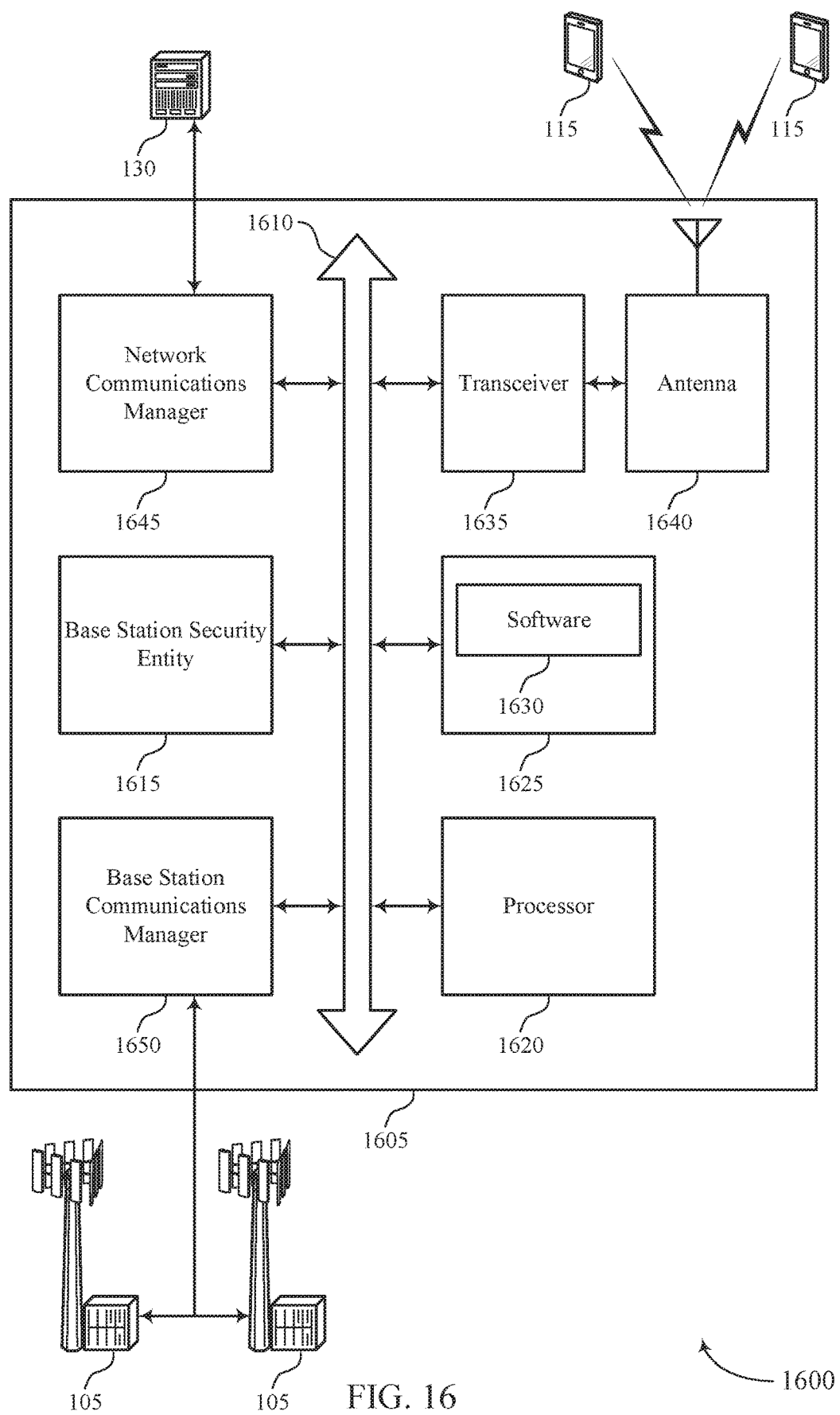
FIG. 16 illustrates a block diagram of a system including a base station that supports techniques for securing a PDCP control PDU in accordance with aspects of the present disclosure.

FIG. 16 shows a diagram of a system 1600 including a device 1605 that supports techniques for securing a PDCP control PDU in accordance with various aspects of the present disclosure. Device 1605 may be an example of or include the components of base station 105 as described above, e.g., with reference to FIG. 1. Device 1605 may include components for bi-directional voice and data communications including components for transmitting and receiving communications, including base station security entity 1615, processor 1620, memory 1625, software 1630, transceiver 1635, antenna 1640, network communications manager 1645, and base station communications manager 1650. These components may be in electronic communication via one or more busses (e.g., bus 1610). Device 1605 may communicate wirelessly with one or more UEs 115.

Processor 1620 may include an intelligent hardware device, (e.g., a general-purpose processor, a DSP, a CPU, a microcontroller, an ASIC, an FPGA, a programmable logic device, a discrete gate or transistor logic component, a discrete hardware component, or any combination thereof). In some aspects, processor 1620 may be configured to operate a memory array using a memory controller. In other aspects, a memory controller may be integrated into processor 1620. Processor 1620 may be configured to execute computer-readable instructions stored in a memory to perform various functions (e.g., functions or tasks supporting techniques for securing a PDCP control PDU).

Memory 1625 may include RAM and ROM. The memory 1625 may store computer-readable, computer-executable software 1630 including instructions that, when executed, cause the processor to perform various functions described herein. In some aspects, the memory 1625 may contain, among other things, a BIOS that may control basic hardware and/or software operation such as the interaction with peripheral components or devices.

Software 1630 may include code to implement aspects of the present disclosure, including code to support techniques for securing a PDCP control PDU. Software 1630 may be stored in a non-transitory computer-readable medium such as system memory or other memory. In some aspects, the software 1630 may not be directly executable by the processor 1620 but may cause a computer (e.g., when compiled and executed) to perform functions described herein.

Transceiver 1635 may communicate bi-directionally, via one or more antennas, wired, or wireless links as described above. For example, the transceiver 1635 may represent a wireless transceiver and may communicate bi-directionally with another wireless transceiver. The transceiver 1635 may also include a modem to modulate the packets and provide the modulated packets to the antennas for transmission, and to demodulate packets received from the antennas.

In some aspects, the wireless device may include a single antenna 1640. However, in some aspects the device may have more than one antenna 1640, which may be capable of concurrently transmitting or receiving multiple wireless transmissions.

Network communications manager 1645 may manage communications with the core network (e.g., via one or more wired backhaul links). For example, the network communications manager 1645 may manage the transfer of data communications for client devices, such as one or more UEs 115.

Base station communications manager 1650 may manage communications with other base station 105, and may include a controller or scheduler for controlling communications with UEs 115 in cooperation with other base stations 105. For example, the base station communications manager 1650 may coordinate scheduling for transmissions to UEs 115 for various interference mitigation techniques such as beamforming or joint transmission. In some examples, base station communications manager 1650 may provide an X2 interface within an LTE/LTE-A wireless communication network technology to provide communication between base stations 105.

Figure 17:
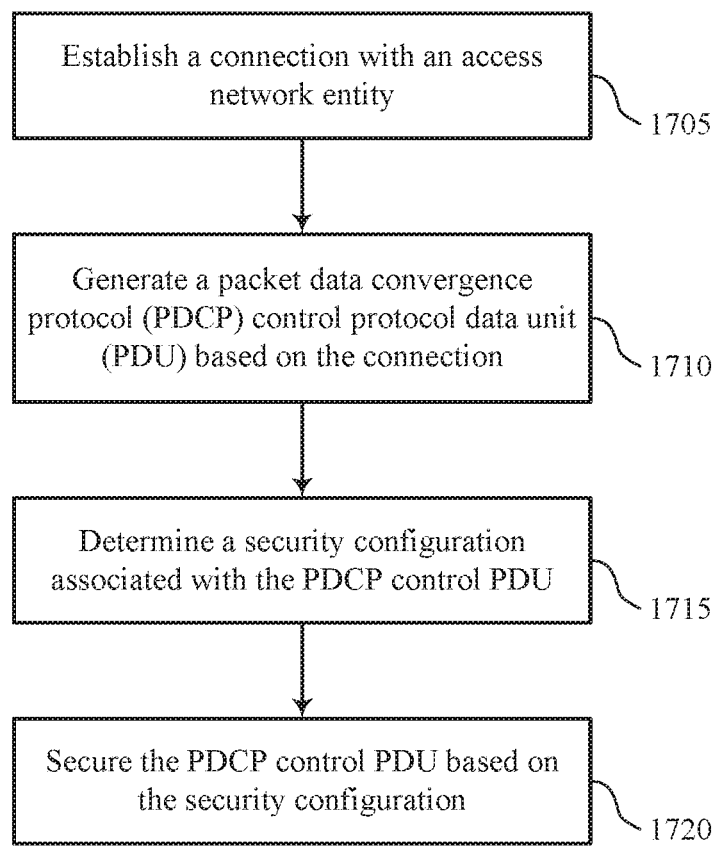
FIGS. 17 through 22 illustrate methods for techniques for securing a PDCP control PDU in accordance with aspects of the present disclosure.

FIG. 17 shows a flowchart illustrating a method 1700 for techniques for securing a PDCP control PDU in accordance with various aspects of the present disclosure. The operations of method 1700 may be implemented by a UE 115 or its components as described herein. For example, the operations of method 1700 may be performed by a UE security entity as described with reference to FIGS. 9 through 12. In some examples, a UE 115 may execute a set of codes to control the functional elements of the device to perform the functions described below. Additionally, the UE 115 may perform aspects the functions described below using special-purpose hardware.

At block 1705 the UE 115 may establish a connection with an access network entity. In some examples, the UE 115 may obtain a security configuration as part of establishing the connection. The operations of block 1705 may be performed according to the methods described with reference to FIGS. 1 through 8. In certain examples, aspects of the operations of block 1705 may be performed by a connection manager (e.g., 1035, 1130) as described with reference to FIGS. 9 through 12.

At block 1710 the UE 115 may generate PDCP control PDU based at least in part on the connection. The operations of block 1710 may be performed according to the methods described with reference to FIGS. 1 through 8. In certain examples, aspects of the operations of block 1710 may be performed by a PDU manager (e.g., 1030, 1125) as described with reference to FIGS. 9 through 12.

At block 1715 the UE 115 may determine a security configuration associated with the PDCP control PDU. The operations of block 1715 may be performed according to the methods described with reference to FIGS. 1 through 8. In certain examples, aspects of the operations of block 1715 may be performed by a security configuration manager (e.g., 1035, 1130) as described with reference to FIGS. 9 through 12.

At block 1720 the UE 115 may secure the PDCP control PDU based at least in part on the security configuration. The operations of block 1720 may be performed according to the methods described with reference to FIGS. 1 through 8. In certain examples, aspects of the operations of block 1720 may be performed by a security configuration manager (e.g., 1035, 1130) as described with reference to FIGS. 9 through 12.

Figure 18:
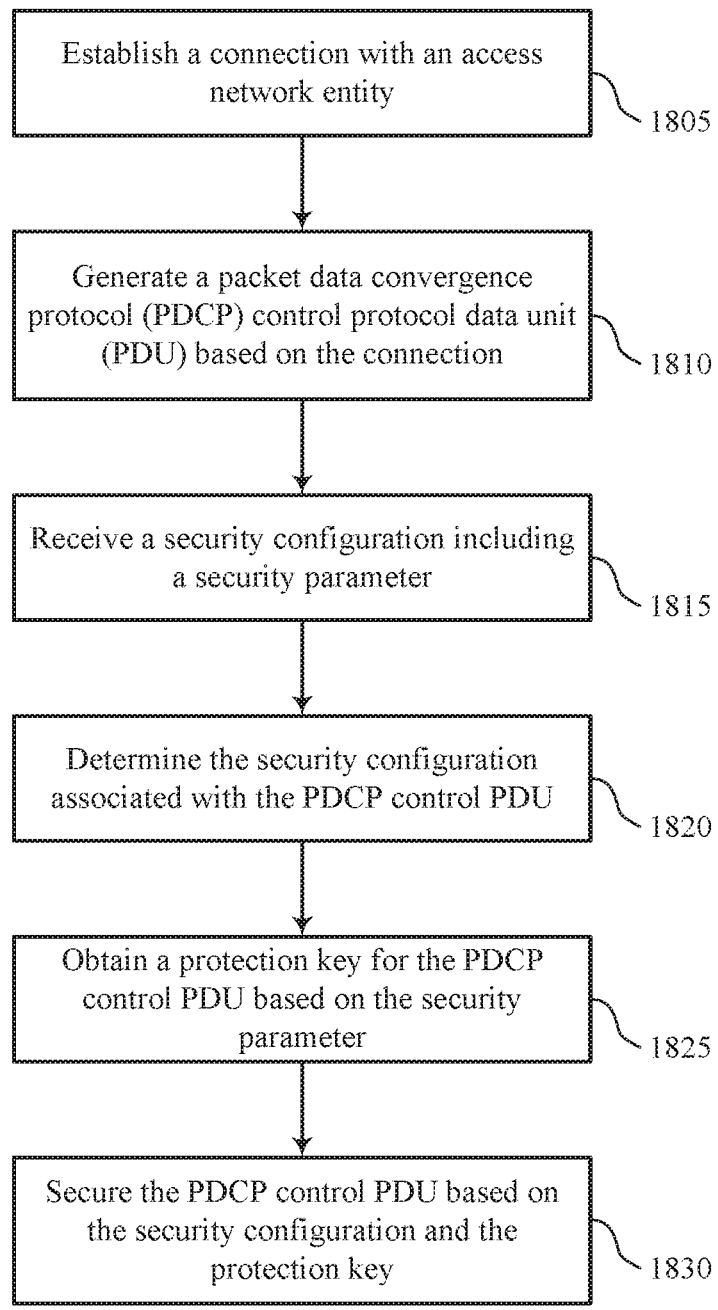

FIG. 18 shows a flowchart illustrating a method 1800 for techniques for securing a PDCP control PDU in accordance with various aspects of the present disclosure. The operations of method 1800 may be implemented by a UE 115 or its components as described herein. For example, the operations of method 1800 may be performed by a UE security entity as described with reference to FIGS. 9 through 12. In some examples, a UE 115 may execute a set of codes to control the functional elements of the device to perform the functions described below. Additionally, the UE 115 may perform aspects the functions described below using special-purpose hardware.

At block 1805 the UE 115 may establish a connection with an access network entity. The operations of block 1805 may be performed according to the methods described with reference to FIGS. 1 through 8. In certain examples, aspects of the operations of block 1805 may be performed by a connection manager (e.g., 1025, 1120) as described with reference to FIGS. 9 through 12.

At block 1810 the UE 115 may generate PDCP control PDU based at least in part on the connection. In some examples, the security procedures for protecting PDCP control PDUs by a UE may include: establishing a connection, obtaining a security configuration, deriving protection key(s), generating a PDCP control PDU, determining the security configuration based on what was obtained, and/or protecting the PDCP control PDU based on the security configuration. The operations of block 1810 may be performed according to the methods described with reference to FIGS. 1 through 8. In certain examples, aspects of the operations of block 1810 may be performed by a PDU manager (e.g., 1030, 1125) as described with reference to FIGS. 9 through 12.

At block 1815 the UE 115 may receive a security configuration including a security parameter. The operations of block 1815 may be performed according to the methods described with reference to FIGS. 1 through 8. In certain examples, aspects of the operations of block 1815 may be performed by a connection manager (e.g., 1025, 1120) as described with reference to FIGS. 9 through 12.

At block 1820 the UE 115 may determine the security configuration associated with the PDCP control PDU. The operations of block 1820 may be performed according to the methods described with reference to FIGS. 1 through 8. In certain examples, aspects of the operations of block 1820 may be performed by a security configuration manager (e.g., 1035, 1130) as described with reference to FIGS. 9 through 12.

At block 1825 the UE 115 may obtain or derive a protection key for the PDCP control PDU based at least in part on the security parameter. The operations of block 1825 may be performed according to the methods described with reference to FIGS. 1 through 8. In certain examples, aspects of the operations of block 1825 may be performed by a security configuration manager (e.g., 1035, 1130) as described with reference to FIGS. 9 through 12.

At block 1830 the UE 115 may secure the PDCP control PDU based at least in part on the security configuration and the protection key. The operations of block 1830 may be performed according to the methods described with reference to FIGS. 1 through 8. In certain examples, aspects of the operations of block 1830 may be performed by a security configuration manager (e.g., 1035, 1130) as described with reference to FIGS. 9 through 12.

Figure 19:
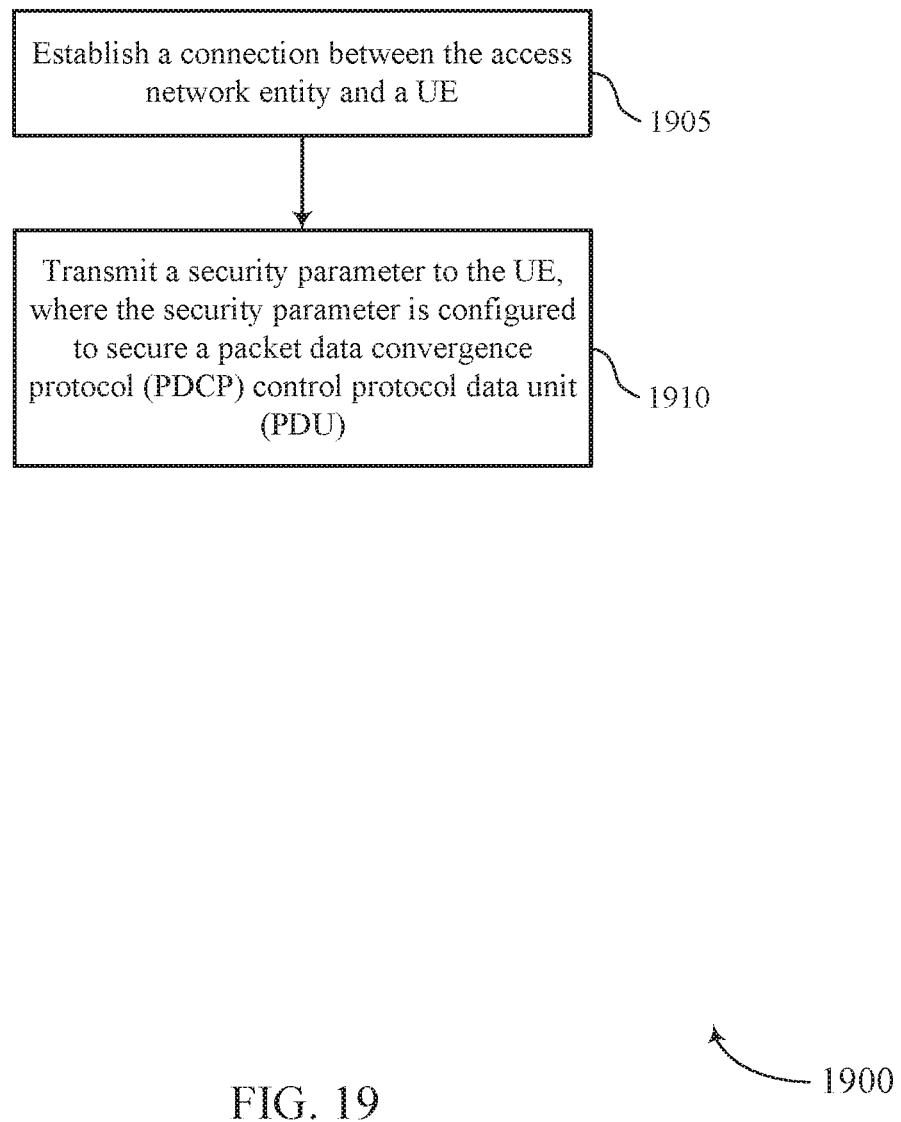

FIG. 19 shows a flowchart illustrating a method 1900 for techniques for securing a PDCP control PDU in accordance with various aspects of the present disclosure. The operations of method 1900 may be implemented by a base station 105 or its components as described herein. For example, the operations of method 1900 may be performed by a base station security entity as described with reference to FIGS. 13 through 16. In some examples, a base station 105 may execute a set of codes to control the functional elements of the device to perform the functions described below. Additionally, the base station 105 may perform aspects the functions described below using special-purpose hardware.

At block 1905 the base station 105 may establish a connection between the access network entity and a UE. The operations of block 1905 may be performed according to the methods described with reference to FIGS. 1 through 8. In certain examples, aspects of the operations of block 1905 may be performed by a connection manager (e.g., 1425, 1520) as described with reference to FIGS. 13 through 16.

At block 1910 the base station 105 may transmit a security parameter to the UE, wherein the security parameter is configured to secure PDCP control PDU. The operations of block 1910 may be performed according to the methods described with reference to FIGS. 1 through 8. In certain examples, aspects of the operations of block 1910 may be performed by a security parameter manager (e.g., 1435, 1530) as described with reference to FIGS. 13 through 16.

In some examples, the base station 105 may identify a first communication link associated with the connection. In these examples, the security parameter may be transmitted based on identifying the first communication link and the PDCP control PDU may be associated with the first communication link.

Figure 20:
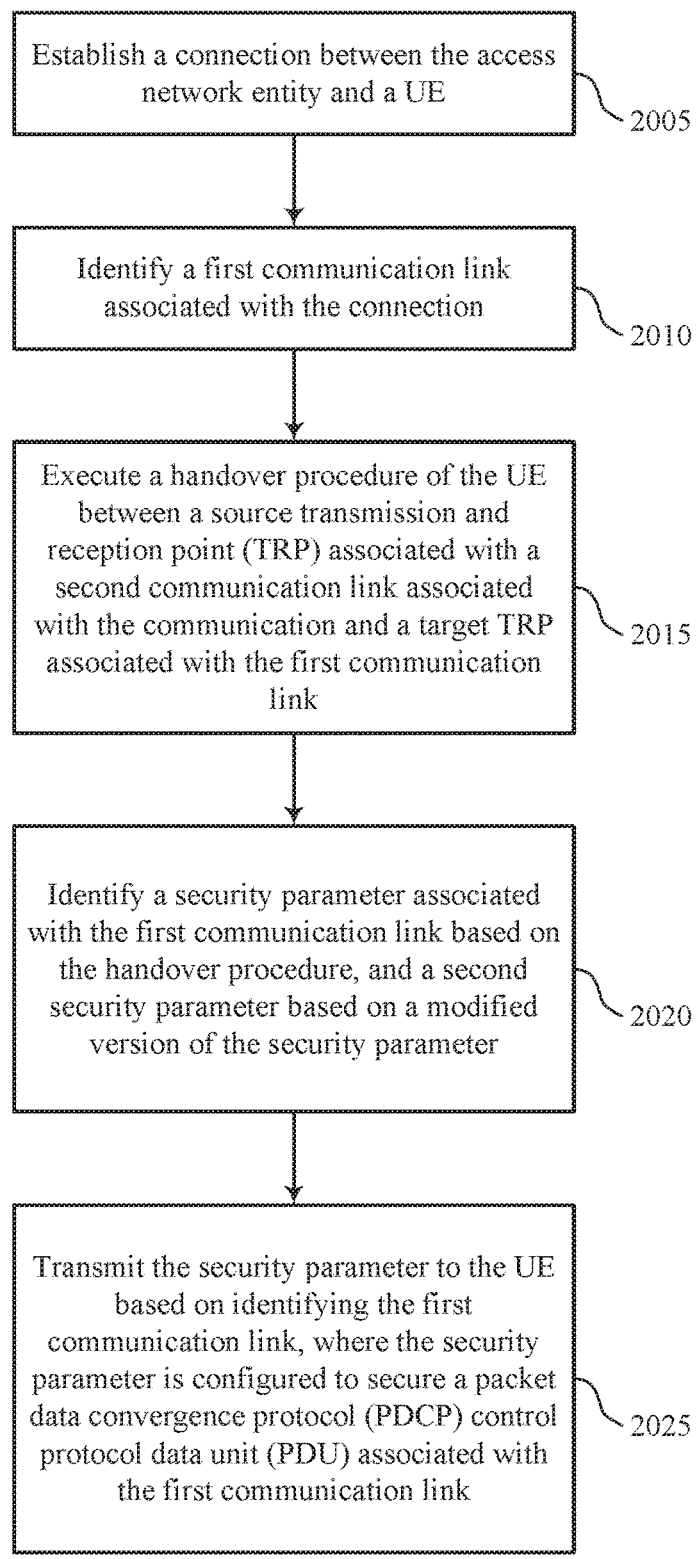

FIG. 20 shows a flowchart illustrating a method 2000 for techniques for securing a PDCP control PDU in accordance with various aspects of the present disclosure. The operations of method 2000 may be implemented by a base station 105 or its components as described herein. For example, the operations of method 2000 may be performed by a base station security entity as described with reference to FIGS. 13 through 16. In some examples, a base station 105 may execute a set of codes to control the functional elements of the device to perform the functions described below. Additionally, the base station 105 may perform aspects the functions described below using special-purpose hardware. In some examples, the method 2000 and/or components thereof may be combined with, and/or performed with the method 1900 and/or components thereof.

At block 2005 the base station 105 may establish a connection between the access network entity and a UE. The operations of block 2005 may be performed according to the methods described with reference to FIGS. 1 through 8. In certain examples, aspects of the operations of block 2005 may be performed by a connection manager (e.g., 1425, 1520) as described with reference to FIGS. 13 through 16.

At block 2010 the base station 105 may identify a first communication link associated with the connection. The operations of block 2010 may be performed according to the methods described with reference to FIGS. 1 through 8. In certain examples, aspects of the operations of block 2010 may be performed by a link manager (e.g., 1040, 1135) as described with reference to FIGS. 13 through 16.

At block 2015, the base station 105 may identify a second communication link associated with the connection, and the base station 105 may execute a handover procedure of the UE between a source TRP associated with the second communication link and a target TRP associated with the first communication link. The operations of block 2015 may be performed according to the methods described with reference to FIGS. 1 through 8. In certain examples, aspects of the operations of block 2015 may be performed by a handover manager (e.g., 1535) as described with reference to FIGS. 13 through 16.

At block 2020 the base station 105 may identify, based at least in part on the handover procedure, a first security parameter associated with the first communication link and/or a second security parameter associated with the second communication link, wherein the first security parameter is based at least in part on a modified version of a second security parameter, and/or the second security parameter is based at least in part on a modified version of the first security parameter. In some examples, the first security parameter and/or the second security parameter may be counters. In these examples, the first security parameter may be a counter that is generated based at least in part on the second security parameter, or vice versa. The operations of block 2020 may be performed according to the methods described with reference to FIGS. 1 through 8. In certain examples, aspects of the operations of block 2020 may be performed by a security parameter manager (e.g., 1435, 1530) as described with reference to FIGS. 13 through 16.

At block 2025 the base station 105 may transmit the security parameter, which in some examples may be a first security parameter, to the UE. In some examples, the first security parameter may be configured to secure PDCP control PDU associated with the first communication link. In some examples, the transmitting may be based at least in part on identifying the first communication link. The operations of block 2025 may be performed according to the methods described with reference to FIGS. 1 through 8. In certain examples, aspects of the operations of block 2025 may be performed by a security parameter manager (e.g., 1435, 1530) as described with reference to FIGS. 13 through 16.

Figure 21:
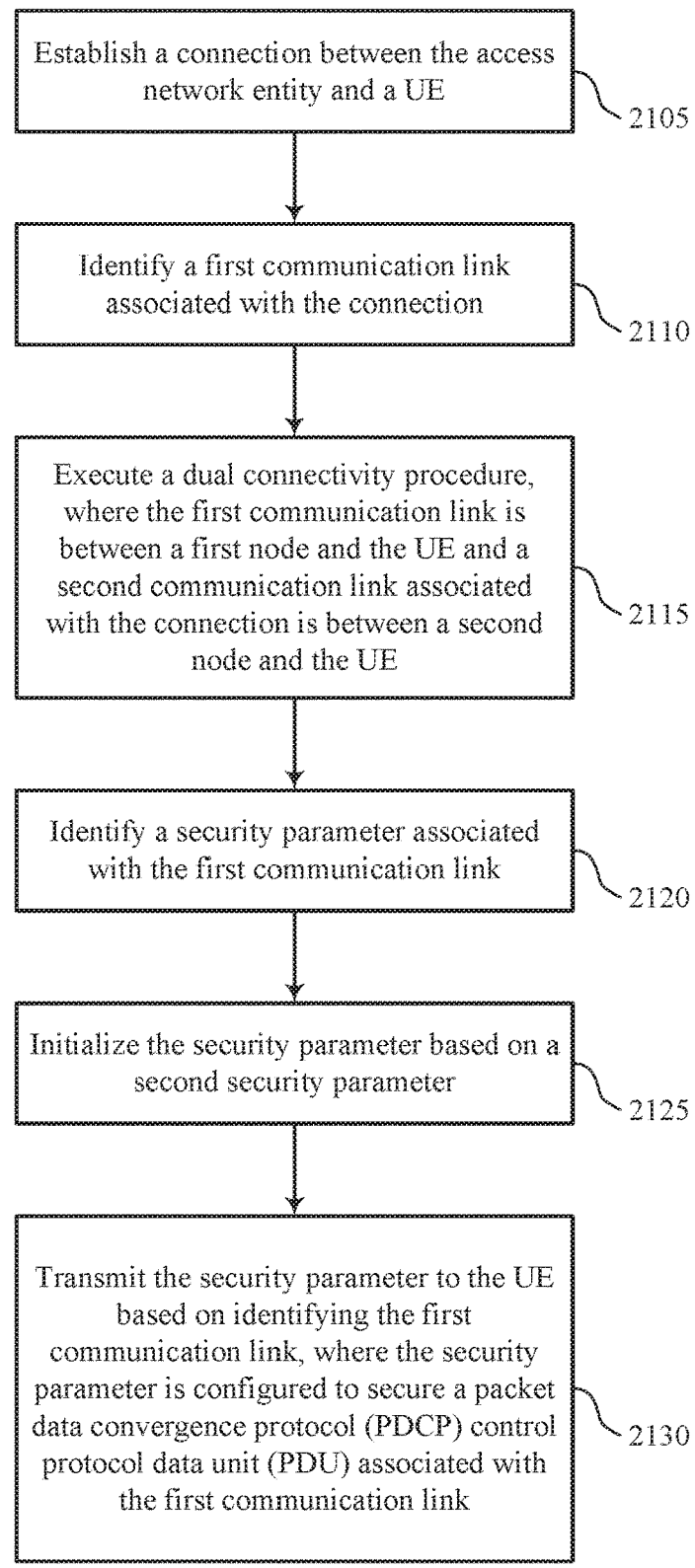

FIG. 21 shows a flowchart illustrating a method 2100 for techniques for securing a PDCP control PDU in accordance with various aspects of the present disclosure. The operations of method 2100 may be implemented by a base station 105 or its components as described herein. For example, the operations of method 2100 may be performed by a base station security entity as described with reference to FIGS. 13 through 16. In some examples, a base station 105 may execute a set of codes to control the functional elements of the device to perform the functions described below. Additionally, the base station 105 may perform aspects of the functions described below using special-purpose hardware.

At block 2105 the base station 105 may establish a connection between the access network entity and a UE. In some examples, establishing the connection may include establishing a communication link between the UE and the base station 105 (e.g., a master base station). When the communication link is established, a security configuration, parameter setup, key derivation procedures, PDCP control PDU protection, and/or other procedures, may be generated or initiated. The operations of block 2105 may be performed according to the methods described with reference to FIGS. 1 through 8. In certain examples, aspects of the operations of block 2105 may be performed by a connection manager (e.g., 1425, 1520) as described with reference to FIGS. 13 through 16.

At block 2110 the base station 105 may identify a first communication link associated with the connection. In some examples, the first communication link may be different from the communication link described above with regard to block 2105, and/or different from a separate second communication link. In some examples, the first communication link may be between the UE and a secondary base station or a secondary access network entity. The operations of block 2110 may be performed according to the methods described with reference to FIGS. 1 through 8. In certain examples, aspects of the operations of block 2110 may be performed by a link manager (e.g., 1040, 1135) as described with reference to FIGS. 13 through 16.

At block 2115 the base station 105 may execute a dual connectivity procedure, wherein the first communication link is between a first node and the UE and a second communication link associated with the connection is between a second node and the UE. In some examples, the second node is a master access network entity or a master base station and the first node is a secondary access network entity or a secondary base station. The operations of block 2115 may be performed according to the methods described with reference to FIGS. 1 through 8. In certain examples, aspects of the operations of block 2115 may be performed by a dual connectivity manager 1540 as described with reference to FIGS. 13 through 16.

At block 2120 the base station 105 may identify a security parameter associated with the first communication link, and/or a second security parameter associated with the second communication link. The operations of block 2120 may be performed according to the methods described with reference to FIGS. 1 through 8. In certain examples, aspects of the operations of block 2120 may be performed by a dual connectivity manager 1540 as described with reference to FIGS. 13 through 16.

At block 2125 the base station 105 may initialize the security parameter (which may also be referred to as the first security parameter) based at least in part on a second security parameter. The operations of block 2125 may be performed according to the methods described with reference to FIGS. 1 through 8. In certain examples, aspects of the operations of block 2125 may be performed by a security parameter manager (e.g., 1435, 1530) as described with reference to FIGS. 13 through 16.

At block 2130 the base station 105 may transmit the security parameter (which may also be referred to as the first security parameter) to the UE based at least in part on identifying the first communication link, wherein the security parameter is configured to secure PDCP control PDU associated with the first communication link. The operations of block 2130 may be performed according to the methods described with reference to FIGS. 1 through 8. In certain examples, aspects of the operations of block 2130 may be performed by a security parameter manager (e.g., 1435, 1530) as described with reference to FIGS. 13 through 16.

Figure 22:
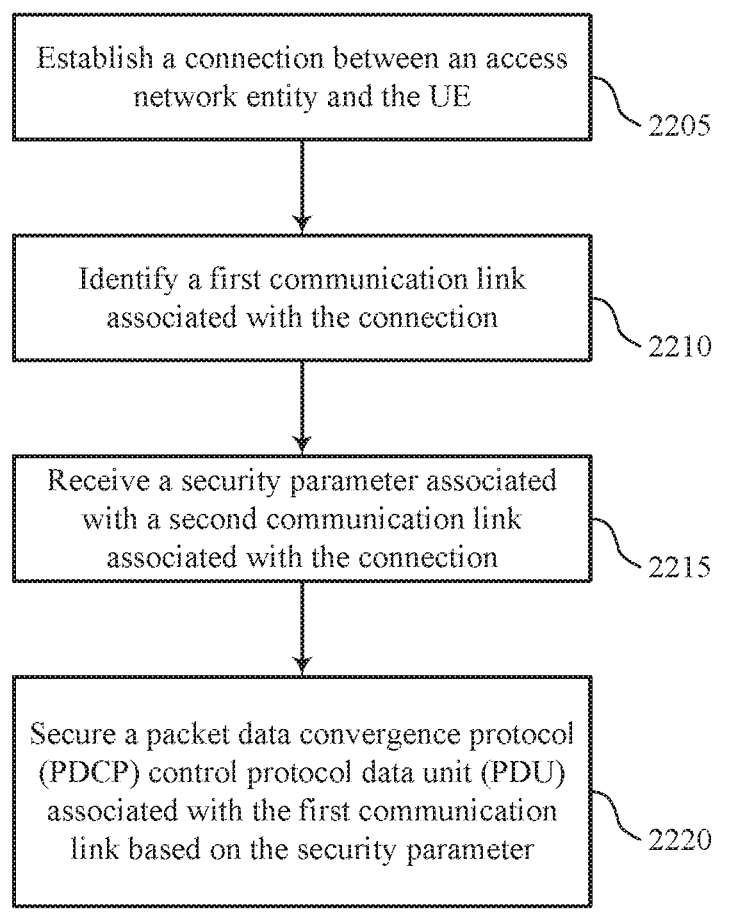

FIG. 22 shows a flowchart illustrating a method 2200 for techniques for securing a PDCP control PDU in accordance with various aspects of the present disclosure. The operations of method 2200 may be implemented by a UE 115 or its components as described herein. For example, the operations of method 2200 may be performed by a UE security entity as described with reference to FIGS. 9 through 12. In some examples, a UE 115 may execute a set of codes to control the functional elements of the device to perform the functions described below. Additionally, the UE 115 may perform aspects the functions described below using special-purpose hardware.

At block 2205 the UE 115 may establish a connection between an access network entity and the UE. The operations of block 2205 may be performed according to the methods described with reference to FIGS. 1 through 8. In certain examples, aspects of the operations of block 2205 may be performed by a connection manager (e.g., 1425, 1520) as described with reference to FIGS. 9 through 12.

At block 2210 the UE 115 may identify a first communication link associated with the connection. The operations of block 2210 may be performed according to the methods described with reference to FIGS. 1 through 8. In certain examples, aspects of the operations of block 2210 may be performed by a link manager (e.g., 1040, 1135) as described with reference to FIGS. 9 through 12.

At block 2215 the UE 115 may receive a security parameter associated with a second communication link associated with the connection. The operations of block 2215 may be performed according to the methods described with reference to FIGS. 1 through 8. In certain examples, aspects of the operations of block 2215 may be performed by a security configuration manager (e.g., 1035, 1130) as described with reference to FIGS. 9 through 12.

At block 2220 the UE 115 may secure PDCP control PDU associated with the first communication link based at least in part on the security parameter. The operations of block 2220 may be performed according to the methods described with reference to FIGS. 1 through 8. In certain examples, aspects of the operations of block 2220 may be performed by a PDU (e.g., 1030, 1125) manager as described with reference to FIGS. 9 through 12.

It should be noted that the methods described above describe possible implementations, and that the operations may be rearranged or otherwise modified and that other implementations are possible. Furthermore, aspects from two or more of the methods may be combined.

Techniques described herein may be used for various wireless communications systems such as CDMA, TDMA, FDMA, OFDMA, single carrier FDMA (SC-FDMA), and other systems. The terms "system" and "network" are often used interchangeably. A CDMA system may implement a radio technology such as CDMA2000, Universal Terrestrial Radio Access (UTRA), etc. CDMA2000 covers IS-2000, IS-95, and IS-856 standards. IS-2000 Releases may be commonly referred to as CDMA2000 1x, 1x, etc. IS-856 (TIA-856) is commonly referred to as CDMA2000 1xEV-DO, High Rate Packet Data (HRPD), etc. UTRA includes Wideband CDMA (WCDMA) and other variants of CDMA. A TDMA system may implement a radio technology such as Global System for Mobile Communications (GSM).

An OFDMA system may implement a radio technology such as Ultra Mobile Broadband (UMB), Evolved UTRA (E-UTRA), Institute of Electrical and Electronics Engineers (IEEE) 802.11 (Wi-Fi), IEEE 802.16 (WiMAX), IEEE 802.20, Flash-OFDM, etc. UTRA and E-UTRA are part of Universal Mobile Telecommunications system (UMTS). 3GPP LTE and LTE-A are releases of UMTS that use E-UTRA. UTRA, E-UTRA, UMTS, LTE, LTE-A, NR, and GSM are described in documents from the organization named "3rd Generation Partnership Project" (3GPP). CDMA2000 and UMB are described in documents from an organization named "3rd Generation Partnership Project 2" (3GPP2). The techniques described herein may be used for the systems and radio technologies mentioned above as well as other systems and radio technologies. While aspects an LTE or an NR system may be described for purposes of example, and LTE or NR terminology may be used in much of the description, the techniques described herein are applicable beyond LTE or NR applications.

In LTE/LTE-A networks, including such networks described herein, the term eNB may be generally used to describe the base stations. The wireless communications system or systems described herein may include a heterogeneous LTE/LTE-A or NR network in which different types of eNBs provide coverage for various geographical regions. For example, each eNB, gNB or base station may provide communication coverage for a macro cell, a small cell, or other types of cell. The term "cell" may be used to describe a base station, a carrier or component carrier associated with a base station, or a coverage area (e.g., sector, etc.) of a carrier or base station, depending on context.

Base stations may include or may be referred to by those skilled in the art as a base transceiver station, a radio base station, an access point, a radio transceiver, a NodeB, eNB, gNB, Home NodeB, a Home eNodeB, or some other suitable terminology. The geographic coverage area for a base station may be divided into sectors making up only a portion of the coverage area. The wireless communications system or systems described herein may include base stations of different types (e.g., macro or small cell base stations). The UEs described herein may be able to communicate with various types of base stations and network equipment including macro eNBs, small cell eNBs, gNBs, relay base stations, and the like. There may be overlapping geographic coverage areas for different technologies.

A macro cell generally covers a relatively large geographic area (e.g., several kilometers in radius) and may allow unrestricted access by UEs with service subscriptions with the network provider. A small cell is a lower-powered base station, as compared with a macro cell, which may operate in the same or different (e.g., licensed, unlicensed, etc.) frequency bands as macro cells. Small cells may include pico cells, femto cells, and micro cells according to various examples. A pico cell, for example, may cover a small geographic area and may allow unrestricted access by UEs with service subscriptions with the network provider. A femto cell may also cover a small geographic area (e.g., a home) and may provide restricted access by UEs having an association with the femto cell (e.g., UEs in a closed subscriber group (CSG), UEs for users in the home, and the like). An eNB for a macro cell may be referred to as a macro eNB. An eNB for a small cell may be referred to as a small cell eNB, a pico eNB, a femto eNB, or a home eNB. An eNB may support one or multiple (e.g., two, three, four, and the like) cells (e.g., component carriers).

The wireless communications system or systems described herein may support synchronous or asynchronous operation. For synchronous operation, the base stations may have similar frame timing, and transmissions from different base stations may be approximately aligned in time. For asynchronous operation, the base stations may have different frame timing, and transmissions from different base stations may not be aligned in time. The techniques described herein may be used for either synchronous or asynchronous operations.

The downlink transmissions described herein may also be called forward link transmissions while the uplink transmissions may also be called reverse link transmissions. Each communication link described herein—including, for example, wireless communication systems 100 and 200 of FIGS. 1 and 2—may include one or more carriers, where each carrier may be a signal made up of multiple sub-carriers (e.g., waveform signals of different frequencies).

The description set forth herein, in connection with the appended drawings, describes example configurations and does not represent all the examples that may be implemented or that are within the scope of the claims. The term "exemplary" used herein means "serving as an example, instance, or illustration," and not "preferred" or "advantageous over other examples." The detailed description includes specific details for the purpose of providing an understanding of the described techniques. These techniques, however, may be practiced without these specific details. In some instances, well-known structures and devices are shown in block diagram form in order to avoid obscuring the concepts of the described examples.

In the appended figures, similar components or features may have the same reference label. Further, various components of the same type may be distinguished by following the reference label by a dash and a second label that distinguishes among the similar components. If just the first reference label is used in the specification, the description is applicable to any one of the similar components having the same first reference label irrespective of the second reference label.

Information and signals described herein may be represented using any of a variety of different technologies and techniques. For example, data, instructions, commands, information, signals, bits, symbols, and chips that may be referenced throughout the above description may be represented by voltages, currents, electromagnetic waves, magnetic fields or particles, optical fields or particles, or any combination thereof.

The various illustrative blocks and modules described in connection with the disclosure herein may be implemented or performed with a general-purpose processor, a DSP, an ASIC, an FPGA or other programmable logic device, discrete gate or transistor logic, discrete hardware components, or any combination thereof designed to perform the functions described herein. A general-purpose processor may be a microprocessor, but in the alternative, the processor may be any conventional processor, controller, microcontroller, or state machine. A processor may also be implemented as a combination of computing devices (e.g., a combination of a DSP and a microprocessor, multiple microprocessors, one or more microprocessors in conjunction with a DSP core, or any other such configuration).

The functions described herein may be implemented in hardware, software executed by a processor, firmware, or any combination thereof. If implemented in software executed by a processor, the functions may be stored on or transmitted over as one or more instructions or code on a computer-readable medium. Other examples and implementations are within the scope of the disclosure and appended claims. For example, due to the nature of software, functions described above can be implemented using software executed by a processor, hardware, firmware, hardwiring, or combinations of any of these. Features implementing functions may also be physically located at various positions, including being distributed such that portions of functions are implemented at different physical locations. Also, as used herein, including in the claims, "or" as used in a list of items (for example, a list of items prefaced by a phrase such as "at least one of" or "one or more of") indicates an inclusive list such that, for example, a list of at least one of A, B, or C means A or B or C or AB or AC or BC or ABC (i.e., A and B and C). Also, as used herein, the phrase "based on" shall not be construed as a reference to a closed set of conditions. For example, an exemplary procedure that is described as "based on condition A" may be based on both a condition A and a condition B without departing from the scope of the present disclosure. In other words, as used herein, the phrase "based on" shall be construed in the same manner as the phrase "based at least in part on."

Computer-readable media includes both non-transitory computer storage media and communication media including any medium that facilitates transfer of a computer program from one place to another. A non-transitory storage medium may be any available medium that can be accessed by a general purpose or special purpose computer. By way of example, and not limitation, non-transitory computer-readable media may comprise RAM, ROM, electrically erasable programmable read only memory (EEPROM), compact disk (CD) ROM or other optical disk storage, magnetic disk storage or other magnetic storage devices, or any other non-transitory medium that can be used to carry or store desired program code means in the form of instructions or data structures and that can be accessed by a general-purpose or special-purpose computer, or a general-purpose or special-purpose processor. Also, any connection is properly termed a computer-readable medium. For example, if the software is transmitted from a website, server, or other remote source using a coaxial cable, fiber optic cable, twisted pair, digital subscriber line (DSL), or wireless technologies such as infrared, radio, and microwave, then the coaxial cable, fiber optic cable, twisted pair, DSL, or wireless technologies such as infrared, radio, and microwave are included in the definition of medium. Disk and disc, as used herein, include CD, laser disc, optical disc, digital versatile disc (DVD), floppy disk and Blu-ray disc where disks usually reproduce data magnetically, while discs reproduce data optically with lasers. Combinations of the above are also included within the scope of computer-readable media.

The description herein is provided to enable a person skilled in the art to make or use the disclosure. Various modifications to the disclosure will be readily apparent to those skilled in the art, and the generic principles defined herein may be applied to other variations without departing from the scope of the disclosure. Thus, the disclosure is not limited to the examples and designs described herein, but is to be accorded the broadest scope consistent with the principles and novel features disclosed herein.

What is claimed is:

1. A method for wireless communication, comprising:
establishing a connection with an access network entity;
generating a packet data convergence protocol (PDCP) control protocol data unit (PDU) based at least in part on the connection;
obtaining a security information element (IE) in a radio resource control (RRC) message from the access network entity;
determining the security configuration associated with the PDCP control PDU based at least in part on the security IE in the RRC message, the security IE indicating a security algorithm to use with the security configuration, wherein the security configuration includes a security parameter comprising a counter associated with the connection, wherein the counter increments based at least in part on a change in a communication link associated with the connection or based at least in part on a change in source transmission and reception point (TRP), wherein the TRP comprises a source TRP associated with a second communication link;
executing a handover procedure of the UE between the source TRP and a target TRP associated with the first communication link;
transmitting a handover request to the target TRP based at least in part on executing the handover procedure; and
securing the PDCP control PDU based at least in part on the security configuration.

2. The method of claim 1, wherein:
the PDCP control PDU comprises a PDCP status PDU.

3. The method of claim 1, further comprising:
receiving the security configuration; and
obtaining a protection key for the PDCP control PDU based at least in part on the security parameter.

4. The method of claim 1, further comprising:
generating a control input parameter for a message authentication code based at least in part on the security configuration, the control input parameter indicating whether an associated PDU is the PDCP control PDU.

5. The method of claim 1, further comprising:
generating a security information element (IE) for a Radio Resource Control (RRC) message, the generated security IE based at least in part on the security configuration.

6. The method of claim 5, wherein:
the security IE indicates a type of security associated with the security configuration.

7. The method of claim 1, wherein:
the PDCP control PDU comprises an interspersed robust header compression (ROHC) feedback packet.

8. The method of claim 1, wherein:
the access network entity comprises a base station.

9. The method of claim 1, further comprising:
determining that the PDCP control PDU should be secured based at least in part on information contained in the security configuration, wherein securing the PDCP control PDU is based at least in part on the determining.

10. A method for wireless communication, comprising:
establishing a connection between the access network entity and a user equipment (UE);
generating a radio resource control (RRC) message, the RRC message including a security information (IE) and a security parameter, the security IE indicating a security algorithm to use with a security configuration associated with a packet data convergence protocol (PDCP) control protocol data unit (PDU); and
transmitting the RRC message to the UE, wherein the security parameter is configured to secure the PDCP control PDU, wherein the security parameter comprises a counter associated with the connection, wherein the counter increments based at least in part on a change in a communication link associated with the connection or based at least in part on a change in source transmission and reception point (TRP), wherein the TRP comprises a source TRP associated with a second communication link;
executing a handover procedure of the UE between the source TRP and a target TRP associated with the first communication link; and
transmitting a handover request to the target TRP based at least in part on executing the handover procedure.

11. The method of claim 10, wherein the communication link comprises a first communication link, the method further comprising:
identifying the first communication link associated with the connection, wherein the security parameter is transmitted based at least in part on identifying the first communication link and the PDCP control PDU is associated with the first communication link.

12. The method of claim 11, wherein transmitting the security parameter further comprises:
transferring a security configuration associated with the second communication link associated with the connection to the UE based at least in part on the identifying.

13. The method of claim 11, further comprising:
initializing the security parameter based at least in part on establishing the connection.

14. The method of claim 11, further comprising:
generating the security parameter based at least in part on a new communication link associated with the connection.

15. The method of claim 11, the method further comprising:
identifying a second security parameter associated with the second communication link based at least in part on the handover procedure, wherein the security parameter is based at least in part on a modified version of the second security parameter.

16. The method of claim 15, wherein transmitting the security parameter further comprises:
transmitting a RRC connection reconfiguration message that includes the modified security parameter to the UE based at least in part on executing the handover procedure.

17. The method of claim 11, further comprising:
executing a dual connectivity procedure, wherein the first communication link is between a first node and the UE and the second communication link associated with the connection is between a second node and the UE;
identifying a second security parameter associated with the second communication link; and
initializing the security parameter based at least in part on the second security parameter.

18. The method of claim 17, wherein:
the second node is a master node and the first node is a secondary node.

19. The method of claim 17, further comprising:
transmitting the second security parameter with the security parameter based at least in part on executing the dual connectivity procedure and initializing the second security parameter.

20. The method of claim 17, wherein:
the first communication link is established using a first radio access technology (RAT); and
the second communication link is established using a second RAT.

21. The method of claim 17, wherein transmitting the security parameter further comprises:
transmitting, by the second node, a RRC connection reconfiguration message that includes the security parameter and the second security parameter to the UE based at least in part on the executing the dual connectivity procedure.

22. A method for wireless communication, comprising:
establishing a connection between an access network entity and a user equipment (UE);
identifying a first communication link associated with the connection;
receiving in a radio resource control (RRC) message a security information element (IE) and a security parameter associated with a second communication link that is associated with the connection, wherein the security parameter comprises a counter associated with the connection, wherein the counter increments based at least in part on a change in a communication link associated with the connection or based at least in part on a change in source transmission and reception point (TRP), wherein the TRP comprises a source TRP associated with the second communication link;
executing a handover procedure of the UE between the source TRP and a target TRP associated with the first communication link;
transmitting a handover request to the target TRP based at least in part on executing the handover procedure; and
securing a packet data convergence protocol (PDCP) control protocol data unit (PDU) associated with the first communication link based at least in part on the security parameter, the security IE indicating a security algorithm to use with a security configuration associated with the PDCP control PDU.

23. The method of claim 22, further comprising:
receiving a handover command from the access network entity.

24. The method of claim 22, further comprising:
receiving a RRC connection reconfiguration message from the access network entity.

25. The method of claim 24, further comprising:
receiving a RRC connection reconfiguration message indicating a status from the access network entity.

26. An apparatus for wireless communication, in a system comprising:
a processor;
memory in electronic communication with the processor; and
instructions stored in the memory and operable, when executed by the processor, to cause the apparatus to:
establish a connection with an access network entity;
generate a packet data convergence protocol (PDCP) control protocol data unit (PDU) based at least in part on the connection;
obtaining a security information element (IE) in a radio resource control (RRC) message from the access network entity; and
determine the security configuration associated with the PDCP control PDU based at least in part on the security IE in the RRC message, the security IE indicating a security algorithm to use with the security configuration, wherein the security configuration includes a security parameter comprising a counter associated with the connection, wherein the counter increments based at least in part on a change in a communication link associated with the connection or based at least in part on a change in source transmission and reception point (TRP), wherein the TRP comprises a source TRP associated with a second communication link;
execute a handover procedure of the UE between the source TRP and a target TRP associated with the first communication link; and
transmit a handover request to the target TRP based at least in part on executing the handover procedure; and
secure the PDCP control PDU based at least in part on the security configuration.

* * * * *